US012424173B2

(12) United States Patent
Huang et al.

(10) Patent No.: US 12,424,173 B2
(45) Date of Patent: Sep. 23, 2025

(54) PIXEL CIRCUIT, PIXEL DRIVING METHOD AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yao Huang, Beijing (CN); Lang Liu, Beijing (CN); Xinyu Wei, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/561,164

(22) PCT Filed: Feb. 27, 2023

(86) PCT No.: PCT/CN2023/078421
§ 371 (c)(1),
(2) Date: Nov. 15, 2023

(87) PCT Pub. No.: WO2024/178537
PCT Pub. Date: Sep. 6, 2024

(65) Prior Publication Data
US 2025/0078765 A1 Mar. 6, 2025

(51) Int. Cl.
*G09G 3/3266* (2016.01)
*G09G 3/3233* (2016.01)
(Continued)

(52) U.S. Cl.
CPC ......... *G09G 3/3266* (2013.01); *G09G 3/3258* (2013.01); *G09G 3/3291* (2013.01); *G09G 2310/08* (2013.01)

(58) Field of Classification Search
None
See application file for complete search history.

(56) References Cited

U.S. PATENT DOCUMENTS 10,964,264 B1 * 3/2021 Kim .................... G09G 3/3291
11,508,320 B2 * 11/2022 Kim .................... G09G 3/3266
(Continued)

FOREIGN PATENT DOCUMENTS

CN 104680977 A 6/2015
CN 106097964 A 11/2016
(Continued)

*Primary Examiner* — Sepehr Azari
(74) *Attorney, Agent, or Firm* — Muncy, Geissler, Olds & Lowe, P.C.

(57) ABSTRACT

The present disclosure provides a pixel circuit, a pixel driving method and a display device. The pixel circuit includes a light-emitting element, a driving circuitry, a first energy storage circuitry, a second energy storage circuitry, a data writing circuitry and a compensation control circuitry. The data writing circuitry writes a data voltage into a second node under the control of a first scanning signal from a first scanning end. The compensation control circuitry controls a first node to be electrically coupled to a second end of the driving circuitry under the control of a second scanning signal from a second scanning end. An effective enabling time period of the second scanning end does not overlap with, and has a length greater than, an effective enabling time period of the first scanning end.

18 Claims, 11 Drawing Sheets

(51) Int. Cl.
*G09G 3/3258* (2016.01)
*G09G 3/3291* (2016.01)

(56) References Cited

U.S. PATENT DOCUMENTS

| | | | | |
|---|---|---|---|---|
| 11,610,541 | B1 * | 3/2023 | Kim | G09G 3/3233 |
| 11,908,396 | B2 * | 2/2024 | Park | G09G 3/32 |
| 11,922,866 | B1 * | 3/2024 | Sohn | G09G 3/3233 |
| 12,033,566 | B2 * | 7/2024 | Yang | G09G 3/3266 |
| 2014/0139503 | A1 * | 5/2014 | Han | G09G 3/3233 345/212 |
| 2016/0155379 | A1 * | 6/2016 | Na | G09G 3/3233 345/215 |
| 2016/0307500 | A1 * | 10/2016 | Han | G09G 3/3233 |
| 2016/0372049 | A1 | 12/2016 | Wang et al. | |
| 2017/0249900 | A1 | 8/2017 | Xiang et al. | |
| 2018/0315374 | A1 | 11/2018 | Zhang et al. | |
| 2019/0221162 | A1 * | 7/2019 | Chen | G09G 3/3258 |
| 2021/0248961 | A1 * | 8/2021 | Yang | G09G 3/3266 |
| 2021/0375192 | A1 * | 12/2021 | Jeon | G09G 3/32 |
| 2022/0270542 | A1 * | 8/2022 | Park | G09G 3/3233 |
| 2023/0306906 | A1 * | 9/2023 | Yang | G09G 3/3266 |
| 2023/0410729 | A1 | 12/2023 | Gai et al. | |
| 2024/0078972 | A1 * | 3/2024 | Zhang | G09G 3/3233 |
| 2024/0105104 | A1 * | 3/2024 | Park | G09G 3/3266 |
| 2024/0153463 | A1 * | 5/2024 | Lee | G09G 3/3233 |
| 2024/0177666 | A1 * | 5/2024 | Xiong | G09G 3/3233 |

FOREIGN PATENT DOCUMENTS

| | | | |
|---|---|---|---|
| CN | 107331352 | A | 11/2017 |
| CN | 112133253 | A | 12/2020 |
| CN | 112908245 | A | 6/2021 |
| CN | 112908425 | A | 6/2021 |
| CN | 113593475 | A | 11/2021 |
| CN | 113781964 | A | 12/2021 |
| CN | 113838420 | A | 12/2021 |
| CN | 113870789 | A | 12/2021 |
| CN | 114120910 | A | 3/2022 |
| CN | 114974082 | A | 8/2022 |

* cited by examiner

PIXEL CIRCUIT, PIXEL DRIVING METHOD AND DISPLAY DEVICE

CROSS REFERENCE TO RELATED APPLICATIONS

This application is a U.S. national phase of PCT Application No. PCT/CN2023/078421 filed on Feb. 27, 2023, the entire contents of which are hereby incorporated by reference.

TECHNICAL FIELD

The present disclosure relates to the field of display technology, in particular to a pixel circuit, a pixel driving method and a display device.

BACKGROUND

During the operation of a pixel circuit, the compensation of a threshold voltage and the writing of a data voltage are performed simultaneously, so it is unable to compensate for the threshold voltage of a driving transistor in a driving circuitry in a better manner.

SUMMARY

In one aspect, the present disclosure provides in some embodiments a pixel circuit, including a light-emitting element, a driving circuitry, a first energy storage circuitry, a second energy storage circuitry, a data writing circuitry and a compensation control circuitry. A first end of the first energy storage circuitry is electrically coupled to a first node, a second end of the first energy storage circuitry is electrically coupled to a second node, and the first energy storage circuitry is configured to store electric energy. A first end of the second energy storage circuitry is electrically coupled to the second node, a second end of the second energy storage circuitry is electrically coupled to a first voltage end, and the second energy storage circuitry is configured to store electric energy. The data writing circuitry is electrically coupled to a first scanning end, a data line and the second node, and configured to write a data voltage from the data line into the second node under the control of a first scanning signal from the first scanning end. The compensation control circuitry is electrically coupled to a second scanning end, the first node and a second end of the driving circuitry, and configured to control the first node to be electrically coupled to the second end of the driving circuitry under the control of a second scanning signal from the second scanning end. A control end of the driving circuitry is electrically coupled to the first node, a first end of the driving circuitry is electrically coupled to a power source voltage end, the second end of the driving circuitry is electrically coupled to the light-emitting element, and the driving circuitry is configured to drive the light-emitting element under the control of a potential at the first node. An effective enabling time period of the second scanning end does not overlap with an effective enabling time period of the first scanning end, and a length of the effective enabling time period of the second scanning end is greater than a length of the effective enabling time period of the first scanning end.

In a possible embodiment of the present disclosure, the pixel circuit further includes a first light-emission control circuitry and a second light-emission control circuitry, the first end of the driving circuitry is electrically coupled to the power source voltage end via the first light-emission control circuitry, the second end of the driving circuitry is electrically coupled to a first electrode of the light-emitting element via the second light-emission control circuitry, and a second electrode of the light-emitting element is electrically coupled to a second voltage end. The first light-emission control circuitry is electrically coupled to a first light-emission control end, the power source voltage end and the first end of the driving circuitry, and configured to control the power source voltage end to be electrically coupled to the first end of the driving circuitry under the control of a first light-emission control signal from the first light-emission control end. The second light-emission control circuitry is electrically coupled to a second light-emission control end, the second end of the driving circuitry and the first electrode of the light-emitting element, and configured to control the second end of the driving circuitry to be electrically coupled to the first electrode of the light-emitting element under the control of a second light-emission control signal from the second light-emission control end.

In a possible embodiment of the present disclosure, the pixel circuit further includes a first initialization circuitry and a second initialization circuitry. The first initialization circuitry is electrically coupled to a first resetting control end, a first initial voltage end and the second end of the driving circuitry, and configured to write a first initial voltage from the first initial voltage end into the second end of the driving circuitry under the control of a first resetting control signal from the first resetting control end. The second initialization circuitry is electrically coupled to a second resetting control end, a second initial voltage end and the first electrode of the light-emitting element, and configured to write a second initial voltage from the second initial voltage end into the first electrode of the light-emitting element under the control of a second resetting control signal from the second resetting control end. A length of an effective enabling time period of the first resetting control end is less than a length of the effective enabling time period of the second scanning end, and the effective enabling time period of the first resetting control end overlaps within the effective enabling time period of the second scanning end.

In a possible embodiment of the present disclosure, the effective enabling time period of the first resetting control end does not overlap with an effective enabling time period of the first light-emission control end.

In a possible embodiment of the present disclosure, the pixel circuit further includes a first resetting circuitry and a second resetting circuitry. The first resetting circuitry is electrically coupled to a third scanning end, a first reference voltage end and the second node, and configured to write a first reference voltage from the first reference voltage end into the second node under the control of a third scanning signal from the third scanning end. The second resetting circuitry is electrically coupled to a third resetting control end, a second reference voltage end and the first end of the driving circuitry, and configured to write a second reference voltage from the second reference voltage end into the first end of the driving circuitry under the control of a third resetting control signal from the third resetting control end.

In a possible embodiment of the present disclosure, the pixel circuit further includes a resetting circuitry electrically coupled to a resetting control end, a reference voltage end, the second node and the first end of the driving circuitry, and configured to write a reference voltage from the reference voltage end into the second node and/or the first end of the driving circuitry under the control of a resetting control signal from the resetting control end.

In a possible embodiment of the present disclosure, the pixel circuit further includes a first control circuit electrically coupled to a first control end, the second node and the second end of the first energy storage circuitry, and configured to control the second node to be electrically coupled to the second end of the first energy storage circuitry under the control of a first control signal from the first control end.

In a possible embodiment of the present disclosure, the first energy storage circuitry includes a first capacitor, the second energy storage circuitry includes a second capacitor, the data writing circuitry includes a first transistor, the compensation control circuitry includes a second transistor, and the driving circuitry includes a driving transistor. A gate electrode of the first transistor is electrically coupled to the first scanning end, a first electrode of the first transistor is electrically coupled to the data line, and a second electrode of the first transistor is electrically coupled to the second node. A gate electrode of the second transistor is electrically coupled to the second scanning end, a first electrode of the second transistor is electrically coupled to the first node, and a second electrode of the second transistor is electrically coupled to the second end of the driving circuitry. A first end of the first capacitor is electrically coupled to the first node, and a second end of the first capacitor is electrically coupled to the second node. A first end of the second capacitor is electrically coupled to the second node, and a second end of the second capacitor is electrically coupled to the first voltage end. A gate electrode of the driving transistor is electrically coupled to the first node, a first electrode of the driving transistor is electrically coupled to the power source voltage end, and a second electrode of the driving transistor is electrically coupled to the light-emitting element.

In a possible embodiment of the present disclosure, the second transistor is an oxide transistor, and the first transistor is a low-temperature polysilicon transistor, or the first transistor and the second transistor are both oxide transistors.

In a possible embodiment of the present disclosure, the first light-emission control circuitry includes a third transistor, and the second light-emission control circuitry includes a fourth transistor. A gate electrode of the third transistor is electrically coupled to the first light-emission control end, a first electrode of the third transistor is electrically coupled to the power source voltage end, and a second electrode of the third transistor is electrically coupled to the first end of the driving circuitry. A gate electrode of the fourth transistor is electrically coupled to the second light-emission control end, a first electrode of the fourth transistor is electrically coupled to the second end of the driving circuitry, and a second electrode of the fourth transistor is electrically coupled to the first electrode of the light-emitting element.

In a possible embodiment of the present disclosure, the first initialization circuitry includes a fifth transistor, and the second initialization circuitry includes a sixth transistor. A gate electrode of the fifth transistor is electrically coupled to the first resetting control end, a first electrode of the fifth transistor is electrically coupled to the first initial voltage end, and a second electrode of the fifth transistor is electrically coupled to the second end of the driving circuitry. A gate electrode of the sixth transistor is electrically coupled to the second resetting control end, a first electrode of the sixth transistor is electrically coupled to the second initial voltage end, and a second electrode of the sixth transistor is electrically coupled to the first electrode of the light-emitting element.

In a possible embodiment of the present disclosure, the first resetting circuitry includes a seventh transistor, and the second resetting circuitry includes an eighth transistor. A gate electrode of the seventh transistor is electrically coupled to the third scanning end, a first electrode of the seventh transistor is electrically coupled to the first reference voltage end, and a second electrode of the seventh transistor is electrically coupled to the second node. A gate electrode of the eighth transistor is electrically coupled to the third resetting control end, a first electrode of the eighth transistor is electrically coupled to the second reference voltage end, and a second electrode of the eighth transistor is electrically coupled to the first end of the driving circuitry. The seventh transistor is an oxide transistor or a low-temperature polysilicon transistor.

In a possible embodiment of the present disclosure, the resetting circuitry includes a ninth transistor, a gate electrode of the ninth transistor is electrically coupled to the resetting control end, a first electrode of the ninth transistor is electrically coupled to the reference voltage end, and a second electrode of the ninth transistor is electrically coupled to the second node and the first end of the driving circuitry.

In a possible embodiment of the present disclosure, the first control circuit includes a tenth transistor, the second node is electrically coupled to the second end of the first energy storage circuitry through the tenth transistor, a gate electrode of the tenth transistor is electrically coupled to the first control end, a first electrode of the tenth transistor is electrically coupled to the second node, and a second electrode of the tenth transistor is electrically coupled to the second end of the first energy storage circuitry.

In a possible embodiment of the present disclosure, the tenth transistor is an oxide transistor.

In another aspect, the present disclosure provides in some embodiments a pixel driving method for the above-mentioned pixel circuit, a display cycle including a compensation phase and a data writing phase independent of each other, the pixel driving method including: within the compensation phase, controlling, by the compensation control circuitry, the first node to be electrically coupled to the second end of the driving circuitry under the control of the second scanning signal; and within the data writing phase, writing, by the data writing circuitry, the data voltage from the data line into the second node under the control of the first scanning signal.

In a possible embodiment of the present disclosure, the pixel circuit further includes the first initialization circuitry, the second initialization circuitry, the first resetting circuitry, the second resetting circuitry, the first light-emission control circuitry and the second light-emission control circuitry, the display cycle further includes a first resetting phase arranged before the compensation phase, and a second resetting phase and a light-emitting phase arranged after the data writing phase, and the light-emitting phase is arranged after the second resetting phase. The pixel driving method further includes: within the first resetting phase, controlling, by the compensation control circuitry, the first node to be electrically coupled to the second end of the driving circuitry under the control of the second scanning signal, writing, by the first initialization circuitry, the first initial voltage into a second end of the driving circuitry under the control of the first resetting control signal, and writing, by the first resetting circuitry, a first reference voltage into the second node under the control of the third scanning signal; within the second resetting phase, writing, by the second initialization circuitry, the second initial voltage into the first electrode of the light-emitting element under the control of the second resetting control signal, and writing, by the second resetting circuitry, the second reference voltage into the first end of the driving circuitry under the control of the third resetting control signal; and within the light-emitting phase, controlling, by the first light-emission control circuitry, the power source voltage end to be electrically coupled to the first end of the driving circuitry under the control of the first light-emission control signal, controlling, by the second light-emission control circuitry, the second end of the driving circuitry to be electrically coupled to the first electrode of the light-emitting element under the control of the second light-emission control signal, and driving, by the driving circuitry, the light-emitting element.

In a possible embodiment of the present disclosure, the pixel circuit further includes the first initialization circuitry, the second initialization circuitry, the resetting circuitry, the first light-emission control circuitry and the second light-emission control circuitry, the display cycle further includes a first resetting phase arranged before the compensation phase, and a second resetting phase and a light-emitting phase arranged after the data writing phase, and the light-emitting phase is arranged after the second resetting phase. The pixel driving method further includes: within the first resetting phase, controlling, by the compensation control circuitry, the first node to be electrically coupled to the second end of the driving circuitry under the control of the second scanning signal, writing, by the first initialization circuitry, the first initial voltage into the second end of the driving circuitry under the control of the first resetting control signal, and writing, by the resetting circuitry, the first reference voltage from the reference voltage end into the second node under the control of the resetting control signal; within the second resetting phase, writing, by the second initialization circuitry, the second initial voltage into the first electrode of the light-emitting element under the control of the second resetting control signal, and writing, by the resetting circuitry, the second reference voltage from the reference voltage end into the first end of the driving circuitry under the control of the resetting control signal; and within the light-emitting phase, controlling, by the first light-emission control circuitry, the power source voltage end to be electrically coupled to the first end of the driving circuitry under the control of the first light-emission control signal, controlling, by the second light-emission control circuitry, the second end of the driving circuitry to be electrically coupled to the first electrode of the light-emitting element under the control of the second light-emission control signal, and driving, by the driving circuitry, the light-emitting element.

In a possible embodiment of the present disclosure, a maintenance frame includes an initialization phase and a light-emission maintenance phase arranged one after another, and the pixel circuit further includes the second initialization circuitry, the first light-emission control circuitry and the second light-emission control circuitry. The pixel driving method further includes: within the initialization phase, writing, by the second initialization circuitry, the second initial voltage into the first electrode of the light-emitting element under the control of the second resetting control signal; and within the light-emission maintenance phase, controlling, by the first light-emission control circuitry, the power source voltage end to be electrically coupled to the first end of the driving circuitry under the control of the first light-emission control signal, controlling, by the second light-emission control circuitry, the second end of the driving circuitry to be electrically coupled to the first electrode of the light-emitting element under the control of the second light-emission control signal, and driving, by the driving circuitry, the light-emitting element.

In yet another aspect, the present disclosure provides in some embodiments a display device including the above-mentioned pixel circuit.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be thin film transistors (TFTs), field effect transistors (FETs) or any other elements having an identical characteristic. In order to differentiate two electrodes other than a gate electrode from each other, one of the two electrodes is called as first electrode and the other is called as second electrode.

In actual use, when the transistor is a TFT or FET, the first electrode may be a drain electrode while the second electrode may be a source electrode, or the first electrode may be a source electrode while the second electrode may be a drain electrode.

Figure 1:
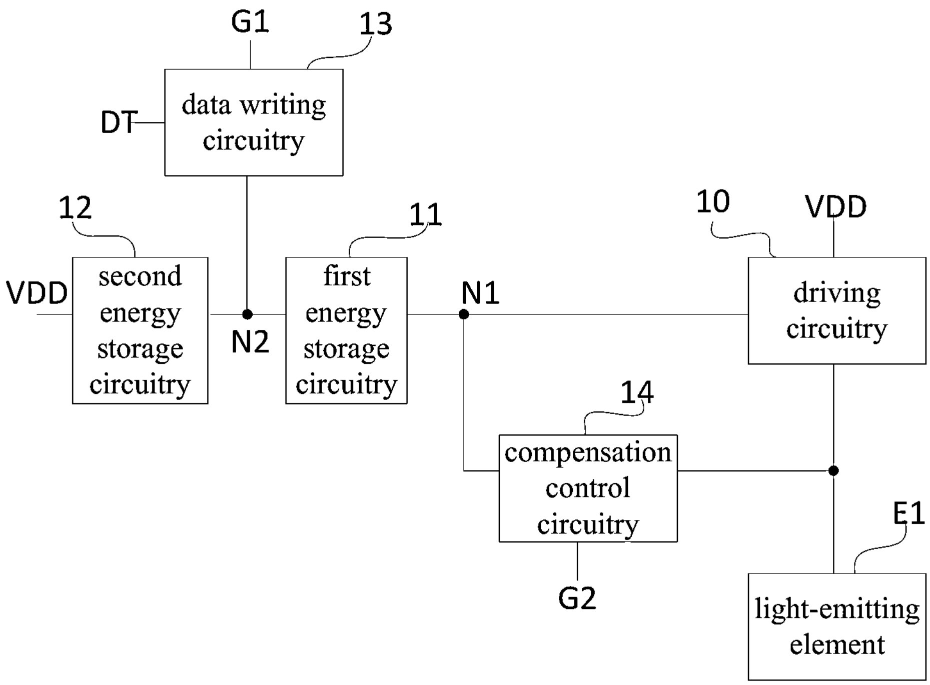
FIG. 1 is a schematic view showing a pixel circuit according to one embodiment of the present disclosure.

As shown in FIG. 1, the present disclosure provides in some embodiments a pixel circuit, which includes a light-emitting element E1, a driving circuitry 10, a first energy storage circuitry 11, a second energy storage circuitry 12, a data writing circuitry 13 and a compensation control circuitry 14. A first end of the first energy storage circuitry 11 is electrically coupled to a first node N1, a second end of the first energy storage circuitry 11 is electrically coupled to a second node N2, and the first energy storage circuitry 11 is configured to store electric energy. A first end of the second energy storage circuitry 12 is electrically coupled to the second node N2, a second end of the second energy storage circuitry 12 is electrically coupled to a first voltage end V1, and the second energy storage circuitry 12 is configured to store electric energy. The data writing circuitry 13 is electrically coupled to a first scanning end G1, a data line DT and the second node N2, and configured to write a data voltage Vdata from the data line DT into the second node N2 under the control of a first scanning signal from the first scanning end G1. The compensation control circuitry 14 is electrically coupled to a second scanning end G2, the first node N1 and the second end of the driving circuitry 10, and configured to control the first node N1 to be electrically coupled to the second end of the driving circuitry 10 under the control of a second scanning signal from the second scanning end G2. A control end of the driving circuitry 10 is electrically coupled to the first node N1, a first end of the driving circuitry 10 is electrically coupled to a power source voltage end VDD, the second end of the driving circuitry 10 is electrically coupled to a light-emitting element E1, and the driving circuitry 10 is configured to drive the light-emitting element E1 under the control of a potential at the first node N1. An effective enabling time period of the second scanning end does not overlap with an effective enabling time period of the first scanning end, and a length of the effective enabling time period of the second scanning end is greater than a length of the effective enabling time period of the first scanning end.

In at least one embodiment of the present disclosure, the effective enabling time period of the second scanning end is a time period within which the second scanning end provides an effective voltage signal, the effective enabling time period of the first scanning end is a time period within which the first scanning end provides an effective voltage signal, the length of the effective enabling time period of the second scanning end is a length of a time period within which the second scanning end continuously outputs the effective voltage signal, and the length of the effective enabling time period of the first scanning end is a length of a time period within which the first scanning end continuously outputs the effective voltage signal.

During the implementation, when a transistor controlled by the second scanning end is a p-type transistor, the effective voltage signal is a low voltage signal, and when the transistor controlled by the second scanning end is an n-type transistor, the effective voltage signal is a high voltage signal. When a transistor controlled by the first scanning end is a p-type transistor, the effective voltage signal is a low voltage signal, and when the transistor controlled by the first scanning end is an n-type transistor, the effective voltage signal is a high voltage signal.

In at least one embodiment of the present disclosure, when the effective enabling time period of the second scanning end does not overlap with the effective enabling time period of the first scanning end, a compensation phase and a data writing phase are independent of each other, so as to improve the threshold voltage compensation capability in the case of high-frequency display. When the length of the effective enabling time period of the second scanning end is greater than the length of the effective enabling time period of the first scanning end, i.e., a duration of the compensation phase is greater than a duration of the data writing phase, so it is able to provide a more sufficient threshold voltage compensation time.

In a possible embodiment of the present disclosure, the first voltage end V1 is, but not limited to, a power source voltage end VDD.

During the operation of the pixel circuit in FIG. 1, a display cycle includes a compensation phase and a data writing phase independent of each other. Within the compensation phase, the compensation control circuitry 14 controls the first node N1 to be electrically coupled to the second end of the driving circuitry 10 under the control of the second scanning signal so as to compensate for a threshold voltage of a driving transistor in the driving circuitry 10. Within the data writing phase, the data writing circuitry 13 writes the data voltage Vdata from the data line DT into the second node N2 under the control of the first scanning signal.

According to the pixel circuit in the embodiments of the present disclosure, the compensation phase is separated from the data writing phase, so as to improve the threshold voltage compensation capability in the case of high-frequency display. As a result, event when a 1 H (a scanning time for one row) is very small, it is still able for the pixel circuit to compensate for the threshold voltage of the driving transistor in a better manner in the case of high-frequency display.

The pixel circuit further includes a first light-emission control circuitry and a second light-emission control circuitry. The first end of the driving circuitry is electrically coupled to the power source voltage end through the first light-emission control circuitry, the second end of the driving circuitry is electrically coupled to a first electrode of the light-emitting element through the second light-emission control circuitry, and a second electrode of the light-emitting element is electrically coupled to a second voltage end. The first light-emission control circuitry is electrically coupled to a first light-emission control end, the power source voltage end and the first end of the driving circuitry, and configured to control the power source voltage end to be electrically coupled to the first end of the driving circuitry under the control of a first light-emission control signal from the first light-emission control end. The second light-emission control circuitry is electrically coupled to a second light-emission control end, the second end of the driving circuitry and the first electrode of the light-emitting element, and configured to control the second end of the driving circuitry to be electrically coupled to the first electrode of the light-emitting element under the control of a second light-emission control signal from the second light-emission control end.

During the implementation, the pixel circuit further includes the first light-emission control circuitry and the second light-emission control circuitry, the first light-emission control circuitry controls the power source voltage end to be electrically coupled to the first end of the driving circuitry under the control of the first light-emission control signal, and the second light-emission control circuitry controls the second end of the driving circuitry to be electrically coupled to the first electrode of the light-emitting element under the second light-emission control signal.

In a possible embodiment of the present disclosure, the light-emitting element is an organic light-emitting diode, the first electrode of the light-emitting element is an anode, and the second electrode of the light-emitting element is a cathode.

In a possible embodiment of the present disclosure, the second voltage end is a low voltage end.

Figure 2:
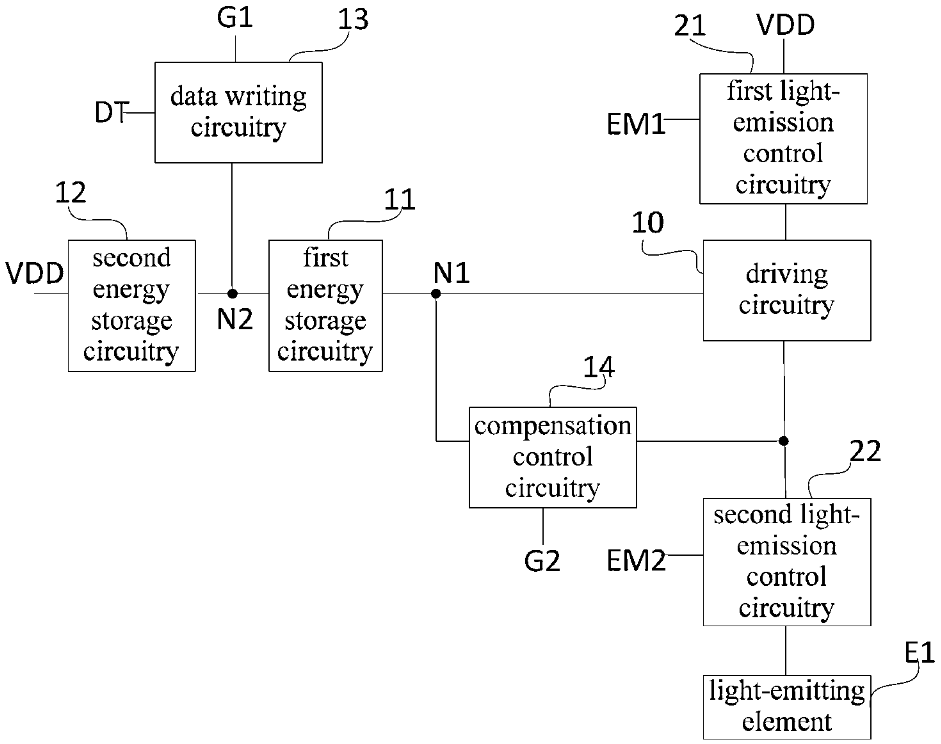
FIG. 2 is another schematic view showing the pixel circuit according to one embodiment of the present disclosure.

As shown in FIG. 2, on the basis of the pixel circuit in FIG. 1, the pixel circuit further includes a first light-emission control circuitry 21 and a second light-emission control circuitry 22. The first end of the driving circuitry 10 is electrically coupled to the power source voltage end VDD through the first light-emission control circuitry 21, the second end of the driving circuitry 10 is electrically coupled to the first electrode of the light-emitting element E1 through the second light-emission control circuitry 22, and the second electrode of the light-emitting element E2 is electrically coupled to a second voltage end. The first light-emission control circuitry 21 is electrically coupled to a first light-emission control end EM1, the power source voltage end VDD and the first end of the driving circuitry 10, and configured to control the power source voltage end VDD to be electrically coupled to the first end of the driving circuitry 10 under the control of a first light-emission control signal from the first light-emission control end EM1. The second light-emission control circuitry 22 is electrically coupled to a second light-emission control end EM2, the second end of the driving circuitry 10 and the first electrode of the light-emitting element E1, and configured to control the second end of the driving circuitry 10 to be electrically coupled to the first electrode of the light-emitting element E1 under the control of a second light-emission control signal from the second light-emission control end EM2.

In at least one embodiment of the present disclosure, the pixel circuit further includes a first initialization circuitry and a second initialization circuitry. The first initialization circuitry is electrically coupled to a first resetting control end, a first initial voltage end and the second end of the driving circuitry, and configured to write a first initial voltage from the first initial voltage end into the second end of the driving circuitry under the control of a first resetting control signal from the first resetting control end. The second initialization circuitry is electrically coupled to a second resetting control end, a second initial voltage end and the first electrode of the light-emitting element, and configured to write a second initial voltage from the second initial voltage end into the first electrode of the light-emitting element under the control of a second resetting control signal from the second resetting control end. A length of an effective enabling time period of the first resetting control end is less than the length of the effective enabling time period of the second scanning end, and the effective enabling time period of the first resetting control end overlaps with the effective enabling time period of the second scanning end.

During the implementation, the pixel circuit furthers include the first initialization circuitry and the second initialization circuitry. The first initialization circuitry writes the first initial voltage into the second end of the driving circuitry under the control of the first resetting control signal, so as to initialize a potential at the second end of the driving circuitry. The second initialization circuitry writes the second initial voltage into the first electrode of the light-emitting element under the control of the second resetting control signal, so as to initialize a potential at the first electrode of the light-emitting element.

In at least one embodiment of the present disclosure, the length of the effective enabling time period of the first resetting control end is a length of a time period within which the first resetting control end continuously outputs an effective voltage signal, and the effective enabling time period of the first resetting control end is a time period within which the first resetting control end outputs the effective voltage signal.

During the implementation, when a transistor controlled by the first resetting control end is a p-type transistor, the effective voltage signal is a low voltage signal, and when a transistor controlled by the second resetting control end is an n-type transistor, the effective voltage signal is a high voltage signal.

In at least one embodiment of the present disclosure, when the effective enabling time period of the first resetting control end is less than the effective enabling time period of the second scanning end, a duration of the compensation phase is greater than a duration of the first resetting phase, so it is able to provide a more sufficient threshold voltage compensation time. Within the first resetting phase, when the first initialization circuitry writes the first initial voltage into the second end of the driving circuitry under the control of the first resetting control signal and the effective enabling time period of the first resetting control end overlaps with the effective enabling time period of the second scanning end, so it is able to initialize the potential at the second end of the driving circuitry while compensating for the threshold voltage.

In a possible embodiment of the present disclosure, the effective enabling time period of the first resetting control end does not overlap with an effective enabling time period of the first light-emission control end. In at least one embodiment of the present disclosure, the effective enabling time period of the first light-emission control end is a time period within which the first light-emission control end provides an effective voltage signal.

During the implementation, when the effective enabling time period of the first resetting control end does not overlap with the effective enabling time period of the first light-emission control end, it is able to prevent the threshold voltage compensation from being adversely affected by the initialization of the potential at the second end of the driving circuitry.

Figure 3:
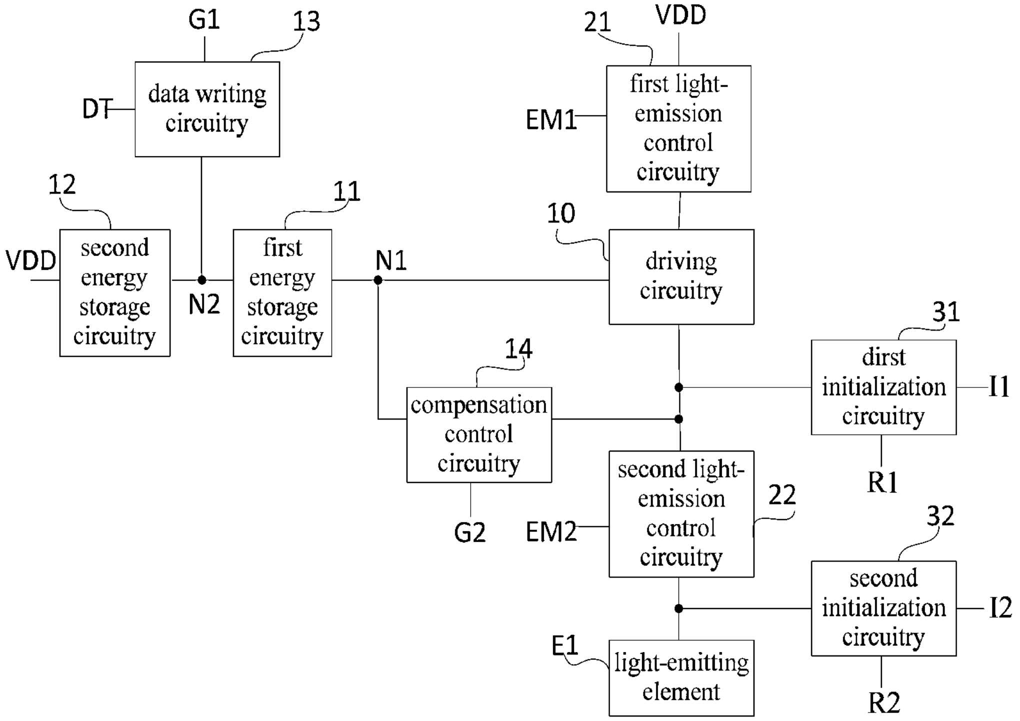
FIG. 3 is yet another schematic view showing the pixel circuit according to one embodiment of the present disclosure.

As shown in FIG. 3, on the basis of the pixel circuit in FIG. 2, the pixel circuit further includes a first initialization circuitry 31 and a second initialization circuitry 32. The first initialization circuitry 31 is electrically coupled to a first resetting control end R1, a first initial voltage end I1 and the second end of the driving circuitry 10, and configured to write a first initial voltage Vinit1 from the first initial voltage end I1 into the second end of the driving circuitry 10 under the control of a first resetting control signal from the first resetting control end R1. The second initialization circuitry 32 is electrically coupled to a second resetting control end R2, a second initial voltage end I2 and the first electrode of the light-emitting element E1, and configured to write a second initial voltage Vinit2 from the second initial voltage end I2 into the first electrode of the light-emitting element E1 under the control of a second resetting control signal from the second resetting control end R2, so as to control the light-emitting element E1 not to emit light and to clear residual charges in the first electrode of the light-emitting element E1.

In at least one embodiment of the present disclosure, the pixel circuit further includes a first resetting circuitry and a second resetting circuitry. The first resetting circuitry is electrically coupled to a third scanning end, a first reference voltage end and the second node, and configured to write a first reference voltage from the first reference voltage end into the second node under the control of a third scanning signal from the third scanning end. The second resetting circuitry is electrically coupled to a third resetting control end, a second reference voltage end and the first end of the driving circuitry, and configured to write a second reference voltage from the second reference voltage end into the first end of the driving circuitry under the control of a third resetting control signal from the third resetting control end.

In a possible embodiment of the present disclosure, the third scanning end is just the second scanning end, or the third scanning signal has a phase reverse to the second scanning signal, but the present disclosure is not limited thereto.

During the implementation, the pixel circuit further includes the first resetting circuitry and the second resetting circuitry. The first resetting circuitry writes the first reference voltage into the second node under the control of the third scanning signal, so as to reset the potential at the second node. The second resetting circuitry writes the second reference voltage into the first end of the driving circuitry, so as to reset the potential at the first end of the driving circuitry under the control of the third resetting control signal.

In at least one embodiment of the present disclosure, the second resetting control end and the third resetting control end are, but not limited to, a same resetting control end.

Figure 4:
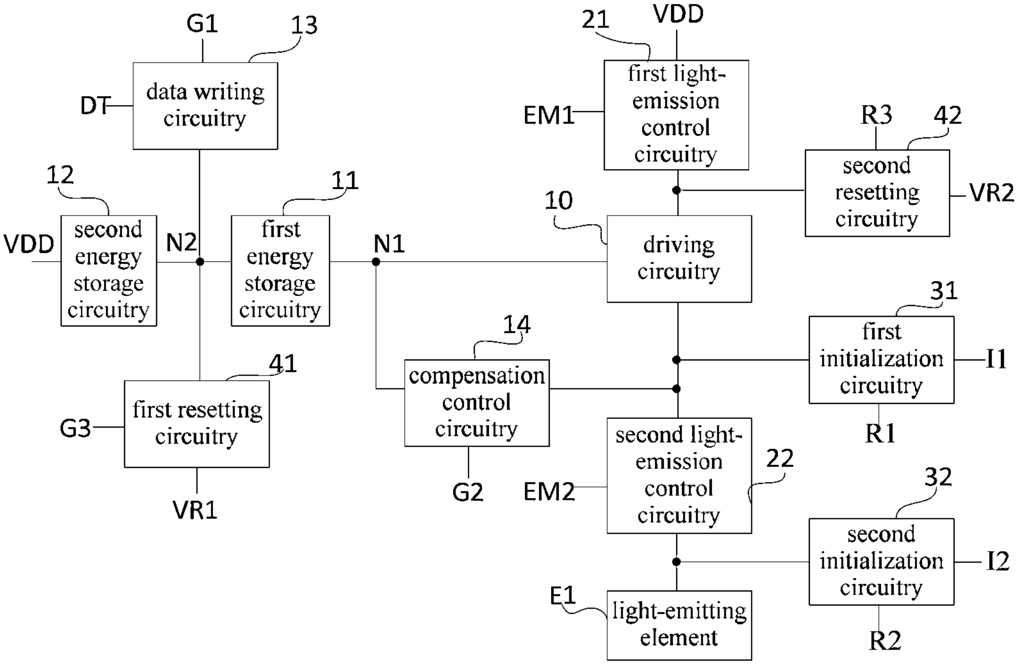
FIG. 4 is still yet another schematic view showing the pixel circuit according to one embodiment of the present disclosure.

As shown in FIG. 4, on the basis of the pixel circuit in FIG. 3, the pixel circuit further includes a first resetting circuitry 41 and a second resetting circuitry 42. The first resetting circuitry 41 is electrically coupled to a third scanning end G3, a first reference voltage end VR1 and the second node N2, and configured to write a first reference voltage Vref1 from the first reference voltage end VR1 into the second node N2 under the control of a third scanning signal from the third scanning end G3. The second resetting circuitry 42 is electrically coupled to a third resetting control end R3, a second reference voltage end VR2 and the first end of the driving circuitry 10, and configured to write a second reference voltage Vref2 from the second reference voltage end VR2 into the first end of the driving circuitry 10 under the control of a third resetting control signal from the third resetting control end R3.

In at least one embodiment of the present disclosure, the pixel circuit further includes a resetting circuitry electrically coupled to a resetting control end, a reference voltage end, the second node and the first end of the driving circuitry, and configured to write a reference voltage from the reference voltage end into the second node and/or the first end of the driving circuitry under the control of a resetting control signal from the resetting control end.

During the implementation, the pixel circuit further includes the resetting circuitry, and the resetting circuitry writes the reference voltage into the second node and/or the first end of the driving circuitry under the control of the resetting control signal, so as to reset the potential at the second node and/or the potential at the first end of the driving circuitry.

Figure 5:
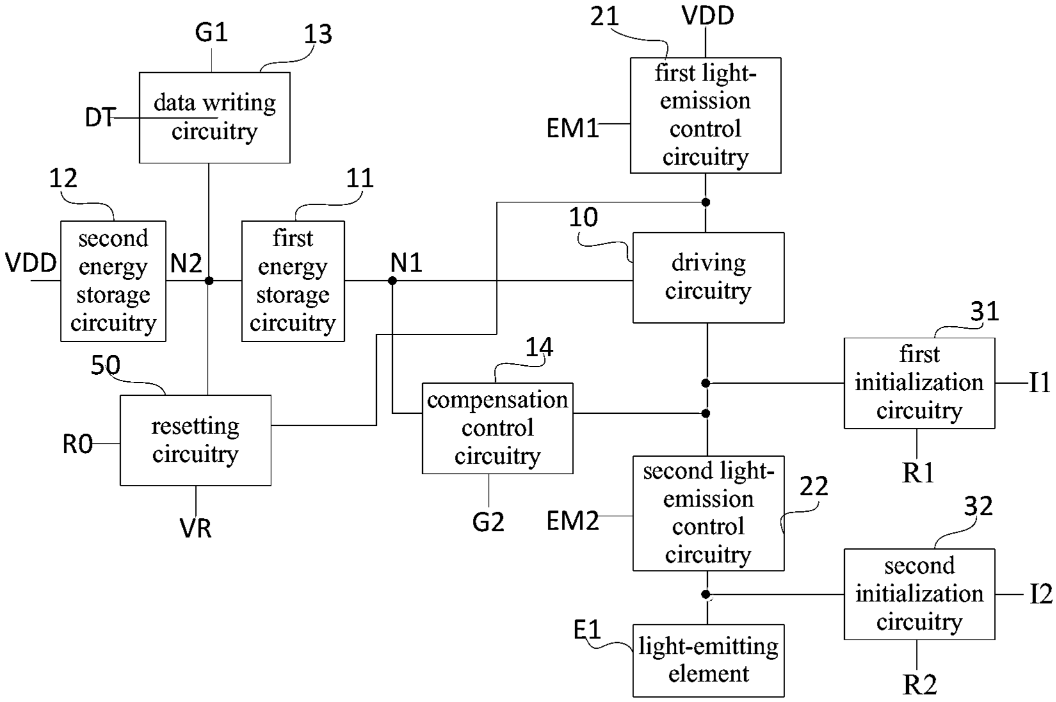
FIG. 5 is still yet another schematic view showing the pixel circuit according to one embodiment of the present disclosure.

As shown in FIG. 5, on the basis of the pixel circuit in FIG. 3, the pixel circuit further includes a resetting circuitry 50 electrically coupled to a resetting control end R0, a reference voltage end VR, the second node N2 and the first end of the driving circuitry 10, and configured to write a reference voltage Vref from the reference voltage end VR into the second node N2 and/or the first end of the driving circuitry 10 under the control of a resetting control signal from the resetting control end R0.

In at least one embodiment of the present disclosure, the pixel circuit further includes a first control circuit electrically coupled to a first control end, the second node and the second end of the first energy storage circuitry, and configured to control the second node to be electrically coupled to the second end of the first energy storage circuitry under the control of a first control signal from the first control end.

During the implementation, the pixel circuit further includes the first control circuit, so as to control the second node to be electrically coupled to the second end of the first energy storage circuitry under the control of the first control signal.

In at least one embodiment of the present disclosure, the first control end is, but not limited to, the second light-emission control end.

Figure 6:
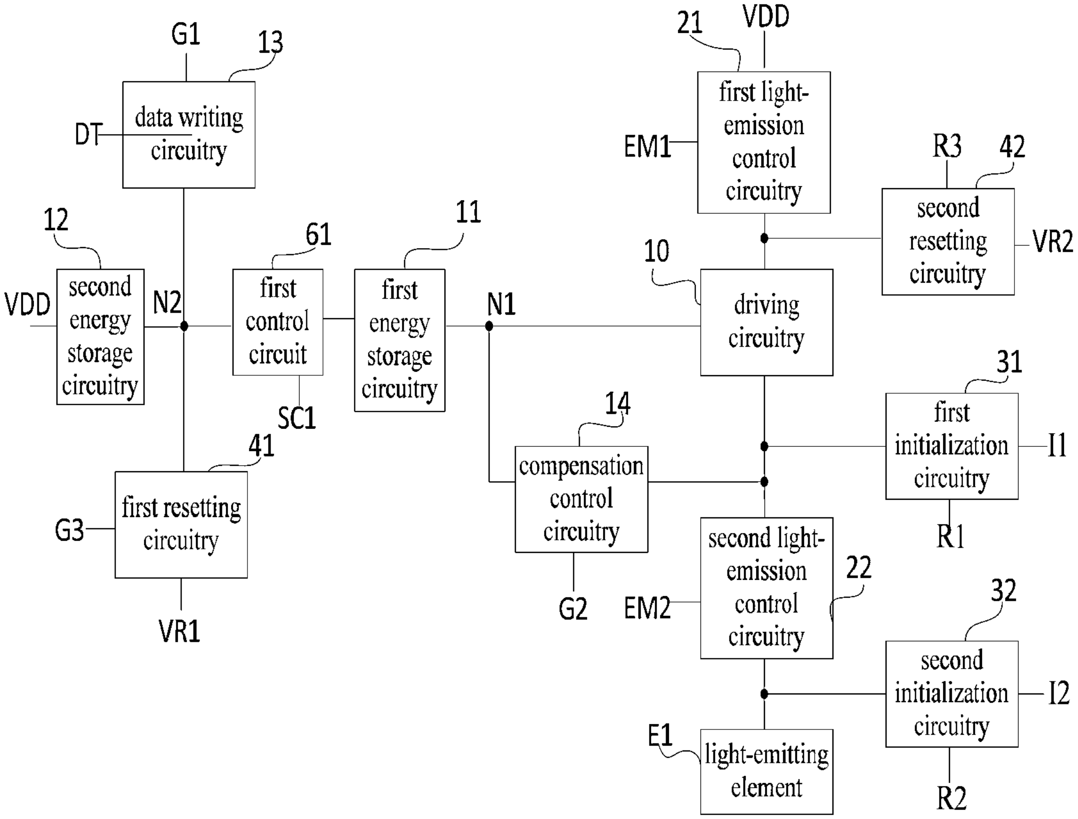
FIG. 6 is still yet another schematic view showing the pixel circuit according to one embodiment of the present disclosure.

As shown in FIG. 6, on the basis of the pixel circuit in FIG. 4, the pixel circuit further includes a first control circuit 61 electrically coupled to the first control end SC1, the second node N2 and the second end of the first energy storage circuitry 11, and configured to control the second node N2 to be electrically coupled to the second end of the first energy storage circuitry 11 under the control of the first control signal from the first control end SC1.

During the implementation, the pixel circuit further includes the first control circuit, so as to control the second node to be electrically coupled to the second end of the first energy storage circuitry under the control of the first control signal.

In at least one embodiment of the present disclosure, the first control end is, but not limited to, the second light-emission control end.

In a possible embodiment of the present disclosure, the first energy storage circuitry includes a first capacitor, the second energy storage circuitry includes a second capacitor, the data writing circuitry includes a first transistor, the compensation control circuitry includes a second transistor, and the driving circuitry includes a driving transistor. A gate electrode of the first transistor is electrically coupled to the first scanning end, a first electrode of the first transistor is electrically coupled to the data line, and a second electrode of the first transistor is electrically coupled to the second node. A gate electrode of the second transistor is electrically coupled to the second scanning end, a first electrode of the second transistor is electrically coupled to the first node, and a second electrode of the second transistor is electrically coupled to the second end of the driving circuitry. A first end of the first capacitor is electrically coupled to the first node, and a second end of the first capacitor is electrically coupled to the second node. A first end of the second capacitor is electrically coupled to the second node, and a second end of the second capacitor is electrically coupled to the first voltage end. A gate electrode of the driving transistor is electrically coupled to the first node, a first electrode of the driving transistor is electrically coupled to the power source voltage end, and a second electrode of the driving transistor is electrically coupled to the light-emitting element.

In at least one embodiment of the present disclosure, the second transistor is an oxide transistor and the first transistor is a low-temperature polysilicon transistor, or the first transistor and the second transistor are both oxide transistors.

In a possible embodiment of the present disclosure, the first light-emission control circuitry includes a third transistor, and the second light-emission control circuitry includes a fourth transistor. A gate electrode of the third transistor is electrically coupled to the first light-emission control end, a first electrode of the third transistor is electrically coupled to the power source voltage end, and a second electrode of the third transistor is electrically coupled to the first end of the driving circuitry. A gate electrode of the fourth transistor is electrically coupled to the second light-emission control end, a first electrode of the fourth transistor is electrically coupled to the second end of the driving circuitry, and a second electrode of the fourth transistor is electrically coupled to the first electrode of the light-emitting element.

In a possible embodiment of the present disclosure, the first initialization circuitry includes a fifth transistor, and the second initialization circuitry includes a sixth transistor. A gate electrode of the fifth transistor is electrically coupled to the first resetting control end, a first electrode of the fifth transistor is electrically coupled to the first initial voltage end, and a second electrode of the fifth transistor is electrically coupled to the second end of the driving circuitry. A gate electrode of the sixth transistor is electrically coupled to the second resetting control end, a first electrode of the sixth transistor is electrically coupled to the second initial voltage end, and a second electrode of the sixth transistor is electrically coupled to the first electrode of the light-emitting element.

In a possible embodiment of the present disclosure, the first resetting circuitry includes a seventh transistor, and the second resetting circuitry includes an eighth transistor. A gate electrode of the seventh transistor is electrically coupled to the third scanning end, a first electrode of the seventh transistor is electrically coupled to the first reference voltage end, and a second electrode of the seventh transistor is electrically coupled to the second node. A gate electrode of the eighth transistor is electrically coupled to the third resetting control end, a first electrode of the eighth transistor is electrically coupled to the second reference voltage end, and a second electrode of the eighth transistor is electrically coupled to the first end of the driving circuitry.

In at least one embodiment of the present disclosure, the seventh transistor is an oxide transistor or a low-temperature polysilicon transistor.

In a possible embodiment of the present disclosure, the resetting circuitry includes a ninth transistor, a gate electrode of the ninth transistor is electrically coupled to the resetting control end, a first electrode of the ninth transistor is electrically coupled to the reference voltage end, and a second electrode of the ninth transistor is electrically coupled to the second node and the first end of the driving circuitry.

In a possible embodiment of the present disclosure, the first control circuit includes a tenth transistor, the second node is electrically coupled to the second end of the first energy storage circuitry through the tenth transistor, a gate electrode of the tenth transistor is electrically coupled to the first control end, a first electrode of the tenth transistor is electrically coupled to the second node, and a second electrode of the tenth transistor is electrically coupled to the second end of the first energy storage circuitry.

In at least one embodiment of the present disclosure, the tenth transistor is an oxide transistor.

In a possible embodiment of the present disclosure, a capacitance of the first capacitor is greater than or equal to a capacitance of the second capacitor.

In at least one embodiment of the present disclosure, the first capacitor is used to store therein the threshold voltage of the driving transistor and the second capacitor is used to store therein the data voltage, so the capacitance of the first capacitor is set as equal to or greater than the capacitance of the second capacitor.

Figure 7:
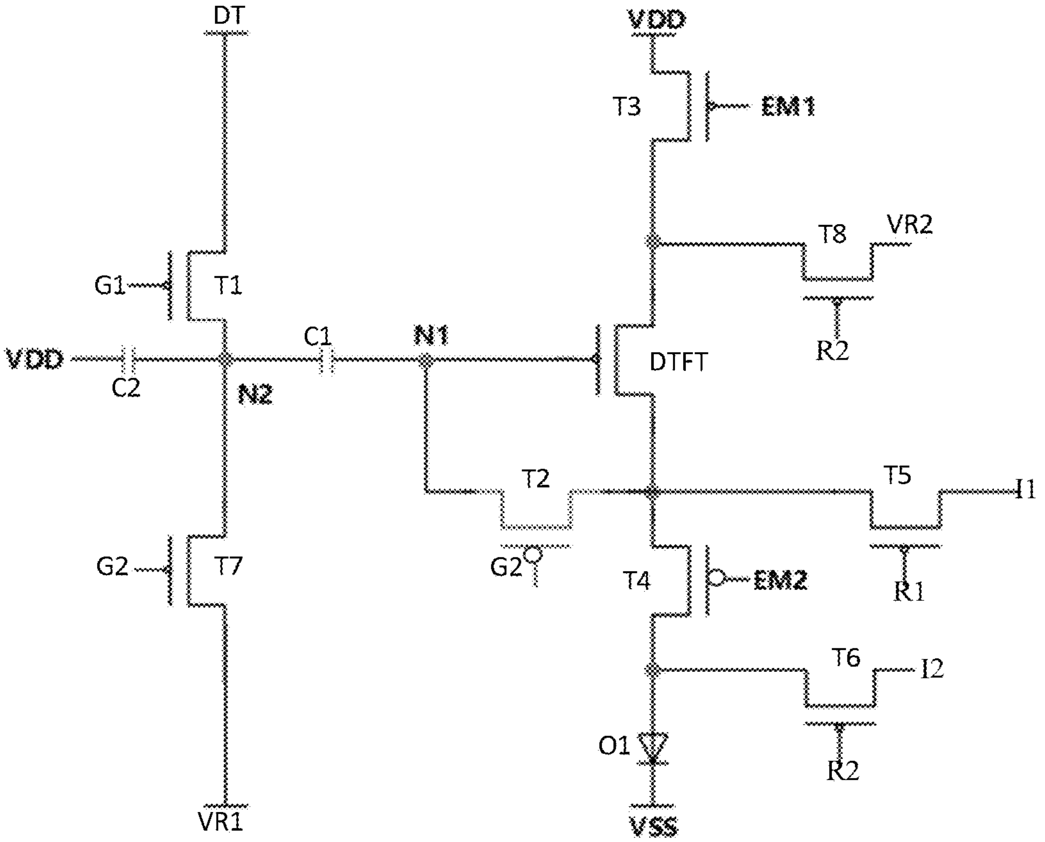
FIG. 7 is a circuit diagram of the pixel circuit according to one embodiment of the present disclosure.

As shown in FIG. 7, on the basis of the pixel circuit in FIG. 4, the first energy storage circuitry includes a first capacitor C1, the second energy storage circuitry includes a second capacitor C2, the data writing circuitry includes a first transistor T1, the compensation control circuitry includes a second transistor T2, and the driving circuitry includes a driving transistor DTFT. The first light-emission control circuitry includes a third transistor T3, and the second light-emission control circuitry includes a fourth transistor T4. The first initialization circuitry includes a fifth transistor T5, and the second initialization circuitry includes a sixth transistor T6. The first resetting circuitry includes a seventh transistor T7, and the second resetting circuitry includes an eighth transistor T8. The light-emitting element is an organic light-emitting diode O1. A gate electrode of the first transistor T1 is electrically coupled to the first scanning end G1, a source electrode of the first transistor T1 is electrically coupled to the data line DT, and a drain electrode of the first transistor T1 is electrically coupled to the second node N2. A gate electrode of the second transistor T2 is electrically coupled to the second scanning end G2, a source electrode of the second transistor T2 is electrically coupled to the first node N1, and a drain electrode of the second transistor T2 is electrically coupled to the drain electrode of the driving transistor DTFT. A first end of the first capacitor C1 is electrically coupled to the first node N1, and a second end of the first capacitor C1 is electrically coupled to the second node N2. A first end of the second capacitor C2 is electrically coupled to the second node N2, and a second end of the second capacitor C2 is electrically coupled to the power source voltage end VDD. A gate electrode of the driving transistor DTFT is electrically coupled to the first node N1. A gate electrode of the third transistor T3 is electrically coupled to the first light-emission control end EM1, a source electrode of the third transistor T3 is electrically coupled to the power source voltage end VDD, and a drain electrode of the third transistor T3 is electrically coupled to the source electrode of the driving transistor DTFT. A gate electrode of the fourth transistor T4 is electrically coupled to the second light-emission control end EM2, a source electrode of the fourth transistor T4 is electrically coupled to the drain electrode of the driving transistor DTFT, and a drain electrode of the fourth transistor T4 is electrically coupled to an anode of the organic light-emitting diode O1. A gate electrode of the fifth transistor T5 is electrically coupled to the first resetting control end R1, a source electrode of the fifth transistor T5 is electrically coupled to the first initial voltage end I1, and a drain electrode of the fifth transistor T5 is electrically coupled to the drain electrode of the driving transistor DTFT. A gate electrode of the sixth transistor T6 is electrically coupled to the second resetting control end R2, a source electrode of the sixth transistor T6 is electrically coupled to the second initial voltage end I2, and a drain electrode of the sixth transistor T6 is electrically coupled to the anode of the organic light-emitting diode O1. A cathode of the organic light-emitting diode O1 is electrically coupled to the low voltage end VSS. A gate electrode of the seventh transistor T7 is electrically coupled to the second scanning end G2, a source electrode of the seventh transistor T7 is electrically coupled to the first reference voltage end VR1, and a drain electrode of the seventh transistor T7 is electrically coupled to the second node N2. A gate electrode of the eighth transistor T8 is electrically coupled to the second resetting control end R2, a source electrode of the eighth transistor T8 is electrically coupled to the second reference voltage end VR2, and a drain electrode of the eighth transistor T8 is electrically coupled to the source electrode of the driving transistor DTFT.

In FIG. 7, the second resetting control end is the same as the third resetting control end.

In FIG. 7, when the first scanning end G1 is an $N^{th}$-level first scanning end, the first resetting control end R1 is an $(N-3)^{th}$-level first scanning end, where N is a positive integer. The third scanning end is the second scanning end G2.

In FIG. 7, all transistors are p-type transistors or LTPS transistors.

Figure 8A:
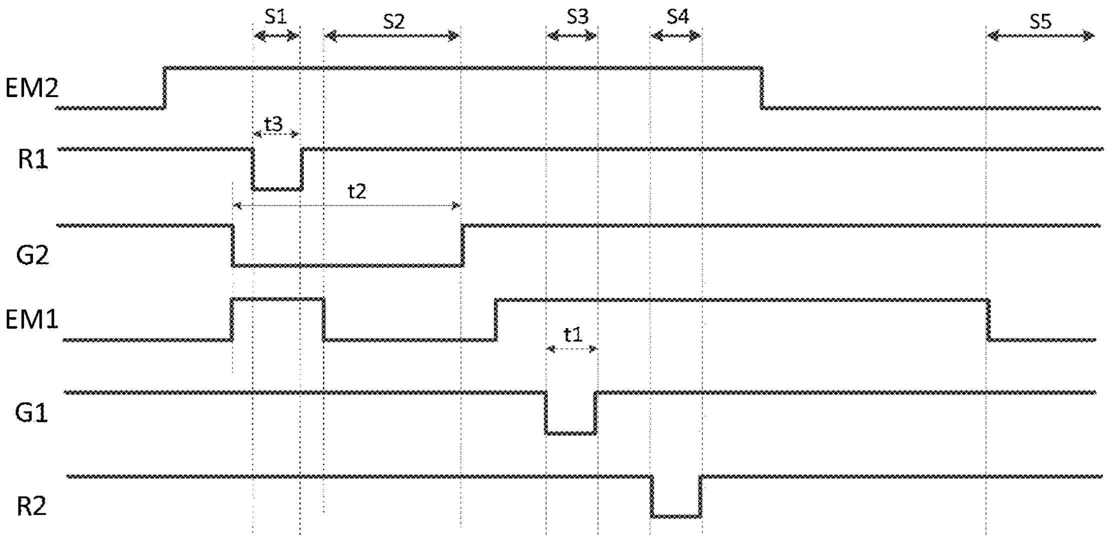
FIG. 8A is a sequence diagram of the pixel circuit in FIG. 7.

FIG. 8A is a sequence diagram of the pixel circuit in FIG. 7.

As shown in FIG. 8A, during the operation of the pixel circuit in FIG. 7, the display cycle includes a first resetting phase S1, a compensation phase S2, a data writing phase S3, a second resetting phase S4 and a light-emitting phase S5 arranged one after another.

Within the first resetting phase S1, EM1 provides a high voltage signal, EM2 provides a high voltage signal, R1 provides a low voltage signal, G2 provides a low voltage signal, G1 provides a high voltage signal, and R2 provides a high voltage signal, so as to turn on T5, T2 and T7. I1 provides the first initial voltage Vinit1, so the potential at the first node N1 is Vinit1. VR1 provides the first reference voltage Vref1, so the potential at the second node N2 is Vref1.

Within the compensation phase S2, EM1 provides a low voltage signal, EM2 provides a high voltage signal, R1 provides a high voltage signal, G2 provides a low voltage signal, G1 provides a high voltage signal and R2 provides a high voltage signal, so as to turn on T3, T2 and T7. At the beginning of the compensation phase S2, DTFT is turned on. The power source voltage from VDD charges C1 through T3, DTFT and T2 until the potential at the first node N1 is Vdd+Vth, and then DTFT is turned off, where Vdd is a voltage value of the power source voltage, and Vth is the threshold voltage of the DTFT.

Within the data writing phase S3, EM2 provides a high voltage signal, R1 provides a high voltage signal, G2 provides a high voltage signal, EM1 provides a high voltage signal, G1 provides a low voltage signal and R2 provides a high voltage signal, so as to turn on T1. DT provides a data voltage Vdata to the second node N2, and at this time the potential at the second node N2 is Vdata, and the potential at the first node N1 is Vdd+Vth+Vdata−Vref1.

Within the second resetting phase S4, EM2 provides a high voltage signal, R1 provides a high voltage signal, G2 provides a high voltage signal, EM1 provides a high voltage signal, G1 provides a high voltage signal and R2 provides a low voltage signal, so as to turn on T6 and T8. I2 provides the second initial voltage Vinit2 to the anode of O1, so as to control O1 not to emit light and to clear the charges in the anode of O1. VR2 provides the second reference voltage Vref2 to the source electrode of DTFT, so as to enable DTFT to be in a biased on-state, thereby to improve the hysteresis of DTFT.

Within the light-emitting phase S5, EM1 and EM2 provide a low voltage signal, and R1, G2, G1 and R2 provide a high voltage signal, so as to turn on T3 and T4. At this time, DTFT drives O1 to emit light. $Io1=0.5\ K(Vgs-Vth)^2=0.5\ K\times(Vdd+Vth+Vdata-Vref1-Vdd-Vth)^2=0.5\ K\times(Vdata-Vref1)^2$, where K is a current coefficient of DTFT, Vgs is a gate-to-source voltage of DTFT, Vth is the threshold voltage of DTFT, and Io1 is a light-emitting current of O1. Based on the above formula, Io1 is independent of Vth and Vdd.

During the operation of the pixel circuit in the embodiments of the present disclosure, the light-emitting current of the organic light-emitting diode is independent of Vdd, so it is able to prevent the light-emitting current from being adversely affected by an IR drop across VDD, thereby to enable the pixel circuit to be applied to a medium-large-size display product.

In at least one embodiment of the present disclosure, the voltage value of Vinit1 is, but not limited to, greater than or equal to −6V and less than or equal to 0V, the voltage value of Vinit2 is, but not limited to, greater than or equal to −6V and less than or equal to 0V, the voltage value of Vref1 is, but not limited to, greater than or equal to 0V and less than or equal to 6V, and the voltage value of Vref2 is, but not limited to, greater than or equal to 0V and less than or equal to 6V. In actual use, the voltage value of the Vref1 may also be a negative value.

As shown in FIG. 8A, a duration of the compensation phase S2 is far greater than a duration of the first resetting phase S1, so as to provide a more sufficient threshold voltage compensation time. In at least one embodiment of the present disclosure, when the duration of the compensation phase S2 is 10 to 20 times the duration of the first resetting phase S1, it is able to improve a threshold voltage compensation effect in a better manner.

In FIG. 8A, the display cycle is a refresh frame.

In FIG. 8A, the effective enabling time period of the first scanning end G1 is a time period within which G1 continuously outputs a low voltage signal, the effective enabling time period of the second scanning end G2 is a time period within which G2 continuously outputs the low voltage signal, and the effective enabling time period of the first resetting control end R1 is a time period within which R1 continuously outputs the low voltage signal.

In FIG. 8A, t1 represents a first effective enabling time period, t2 represents a second effective enabling time period, and t3 represents a third effective enabling time period. The first effective enabling time period t1 is the effective enabling time period of the first scanning end G1, the second effective enabling time period t2 is the effective enabling time period of the second scanning end G2, and the third effective enabling time period t3 is the effective enabling time period of the first resetting control end R1.

Figure 8B:
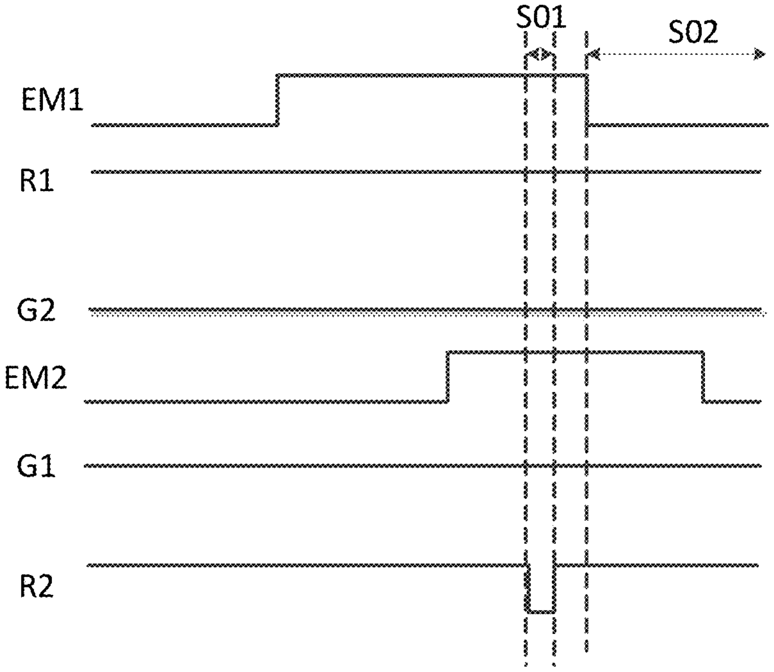
FIG. 8B is another sequence diagram of the pixel circuit in FIG. 7.

As shown in FIG. 8B, during the operation of the pixel circuit in FIG. 7, a maintenance frame includes an initialization phase S01 and a light-emission maintenance phase S02 arranged one after another. Within the initialization phase S01, EM1 and EM2 both provide a high voltage signal, R1 provides a high voltage signal, G2 provides a high voltage signal, G1 provides a high voltage signal and R2 provides a low voltage signal, so as to turn on T6. I2 provides the second initial voltage Vinit2 to the anode of O1, so as to clear the charges in the anode of O1, thereby to improve a flicker phenomenon.

Within the light-emission maintenance phase S02, EM1 and EM2 both provide a low voltage signal, and R1, G2, G1 and R2 provide a high voltage signal, so as to turn on T3 and T4. At this time, DTFT drives O1 to emit light. The pixel circuit in FIG. 9 differs from that in FIG. 7 in that T2 and T7 are n-type transistors, T2 and T7 are oxide transistors, T2 and T7 are indium gallium zinc oxide (IGZO) transistors, DTFT, T1, T3, T4, T5, T6 and T8 are p-type transistors and LTPS transistors.

Figure 9:
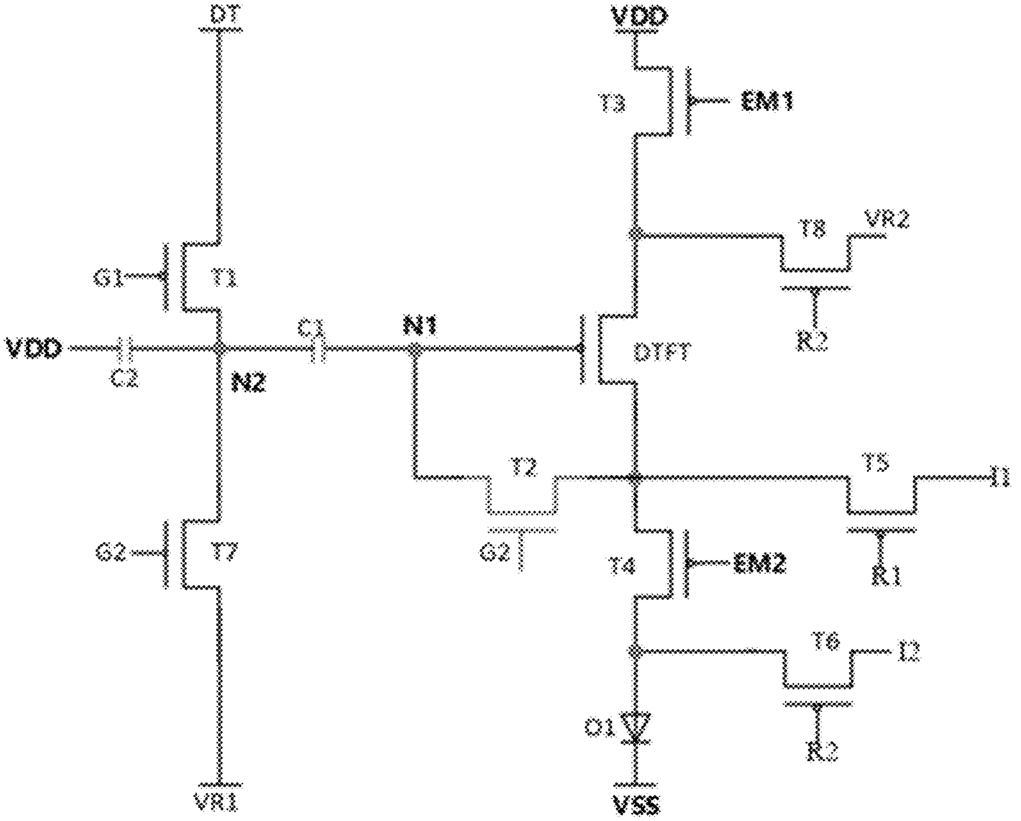
FIG. 9 is another circuit diagram of the pixel circuit according to one embodiment of the present disclosure.
Figure 10:
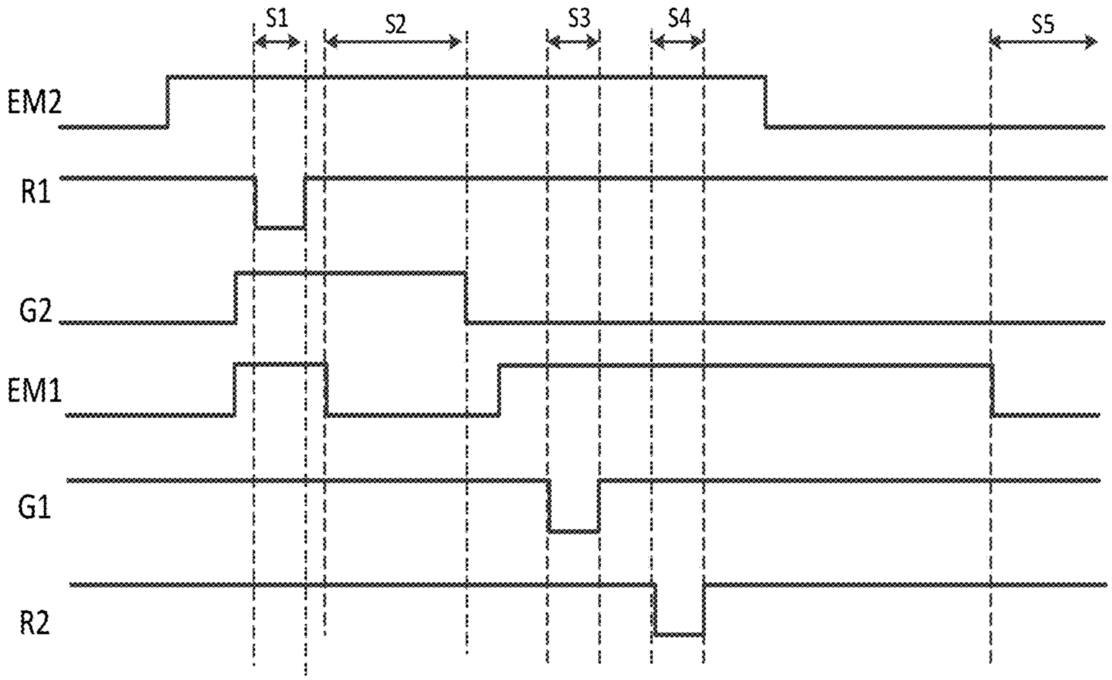
FIG. 10 is a sequence diagram of the pixel circuit in FIG. 9.

FIG. 10 is a sequence diagram of the pixel circuit in FIG. 9.

In FIG. 9, T2 and T7 are IGZO transistors. The IGZO transistor has a small leakage current, so it is able to ensure the stability of the potential at the first node N1 even in the case of low-frequency display, thereby to achieve normal driving.

In at least one embodiment of the present disclosure, T7 is electrically coupled to the second node N2. When T7 is an IGZO transistor, it is able to maintain the potential at the second node N2 in the case of low-frequency display, and prevent the potential at the first node N1 from being adversely affected by the potential at the second node N2 through the first capacitor C1. Hence, in the case of low-frequency display, it is able to ensure the stability of the potential at the first node N1, thereby to ensure the brightness stability at a low frequency.

In the embodiments of the present disclosure, the pixel circuit is driven normally in the case of high-frequency display and low-frequency display, and it is excellent in terms of games as well as power consumption, so it is particularly suitable for a medium-large-size display panel.

Figure 11:
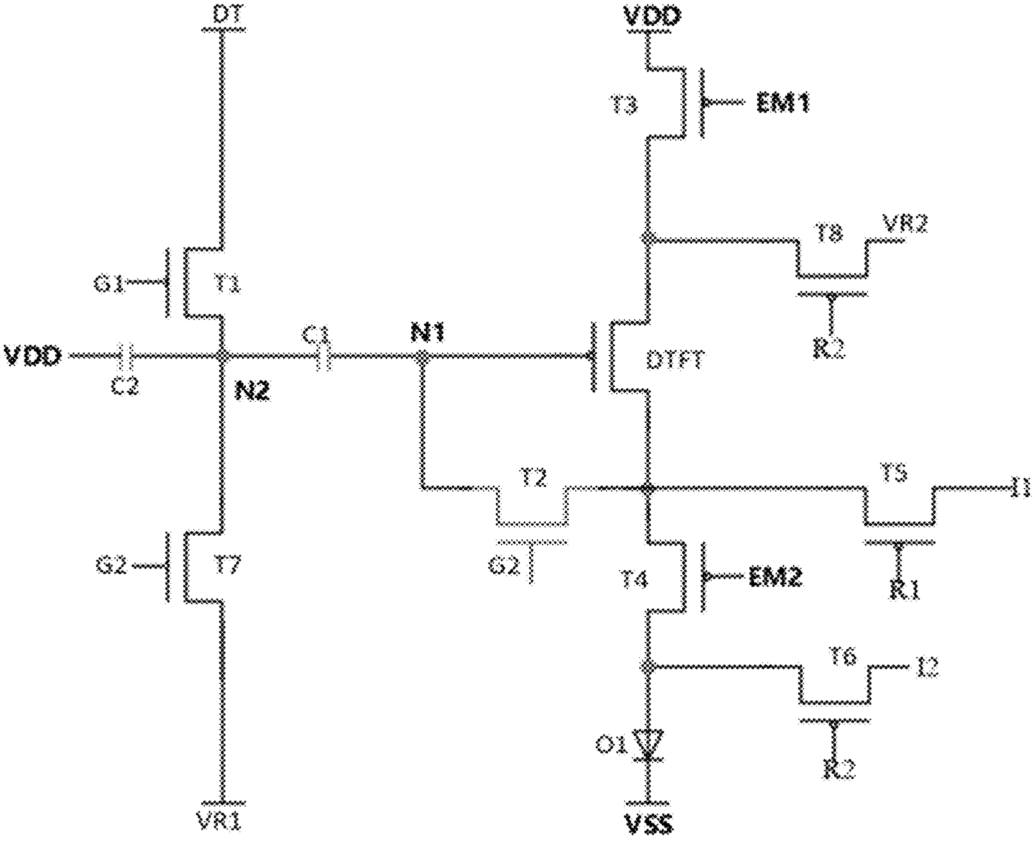
FIG. 11 is yet another circuit diagram of the pixel circuit according to one embodiment of the present disclosure.

The pixel circuit in FIG. 11 differs from that in FIG. 9 in that T1 is an n-type oxide transistor, e.g., an IGZO transistor.

In FIG. 11, T1, T2 and T7 are IGZO transistors. The IGZO transistor has a small leakage current, so it is able to further improve the stability of the potential at the first node N1 in the case of low-frequency display, thereby to achieve the normal display.

In at least one embodiment of the present disclosure, T1 and T7 are electrically coupled to the second node N2. When T1 and T7 are IGZO transistors, it is able to maintain the potential at the second node N2 in the case of low-frequency display. In this way, it is able to prevent the potential at the first node N1 from being adversely affected by the potential at the second node N2 through the first capacitor C1, thereby to ensure the stability of the potential at the first node N1 in the case of low-frequency display.

Figure 12:
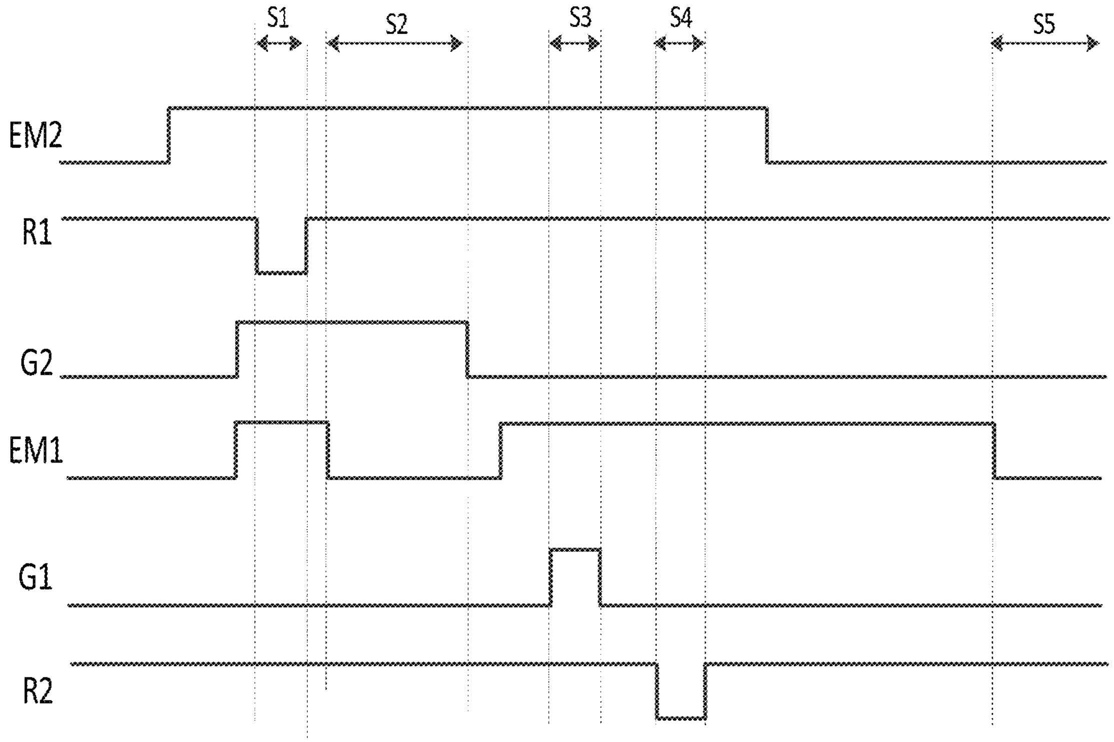
FIG. 12 is a sequence diagram of the pixel circuit in FIG. 11.

FIG. 12 is a sequence diagram of the pixel circuit in FIG. 11.

Figure 13:
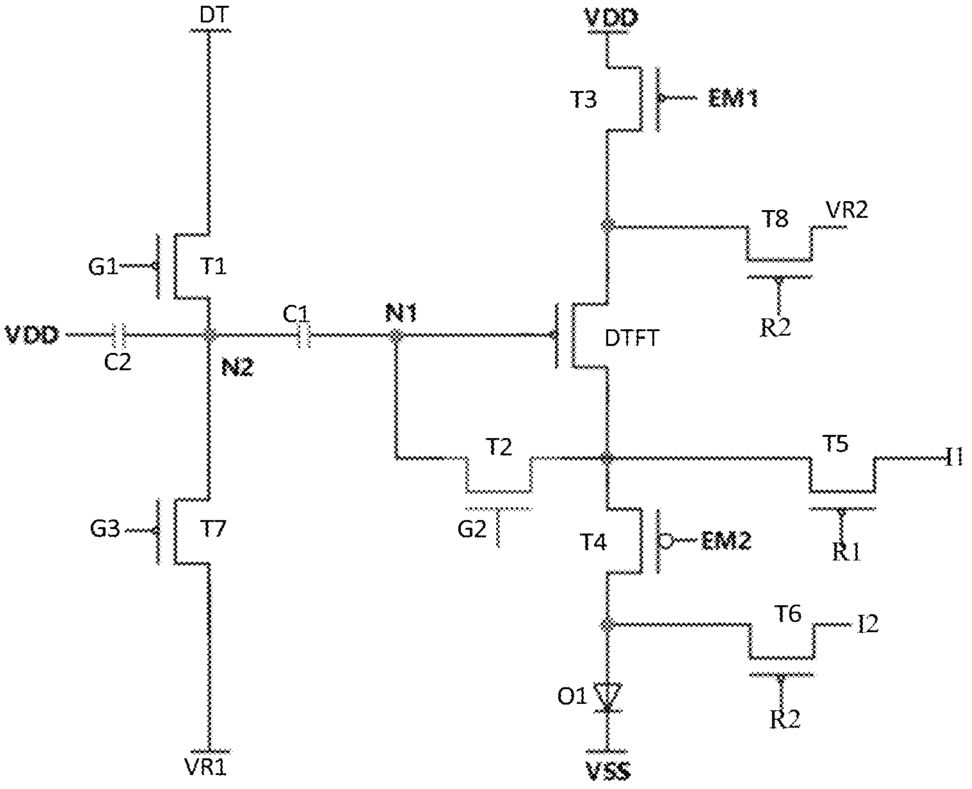
FIG. 13 is yet another circuit diagram of the pixel circuit according to one embodiment of the present disclosure.

The pixel circuit in FIG. 13 differs from that in FIG. 7 in that T2 is an n-type, oxide transistor, e.g., an IGZO transistor, and the gate electrode of T7 is electrically coupled to the third scanning end G3.

In FIG. 13, T2 is an IGZO transistor electrically coupled to the first node N1. The IGZO has a small leakage current, so it is able to further improve the stability of the potential at the first node N1 in the case of low-frequency display, thereby to achieve the normal display.

Figure 14:
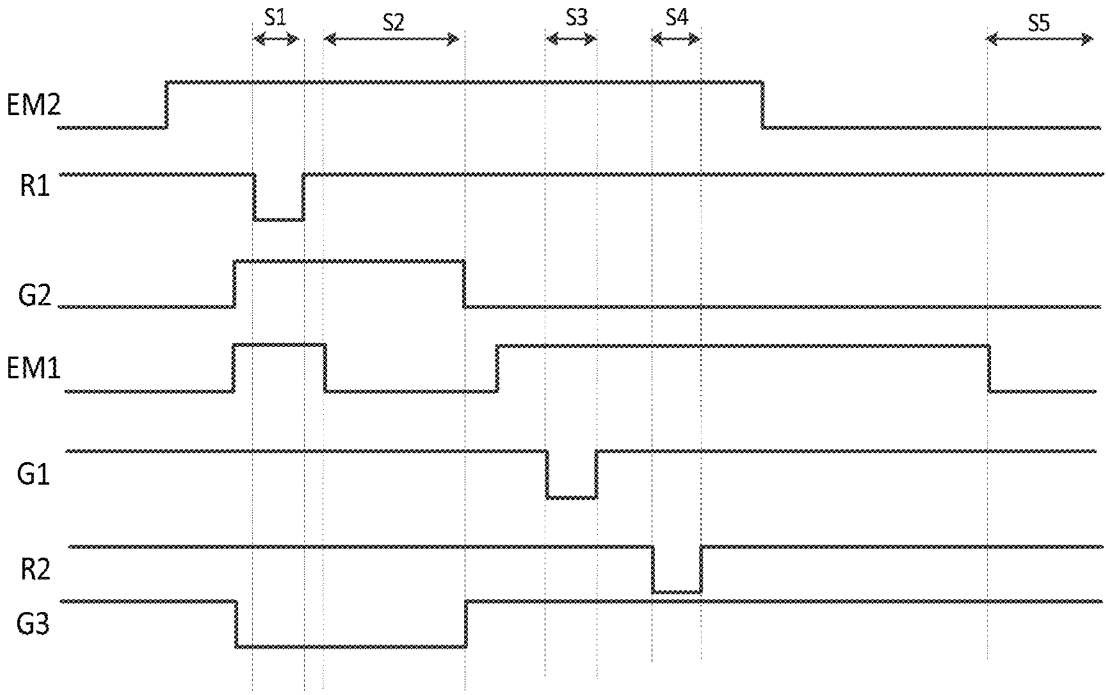
FIG. 14 is a sequence diagram of the pixel circuit in FIG. 13.

FIG. 14 is a sequence diagram of the pixel circuit in FIG. 13.

In FIG. 13, the gate electrode of T7 is electrically coupled to the third scanning end G3, and a third scanning signal from the third scanning end G3 has a phase reverse to the second scanning signal from the second scanning end G2.

In FIG. 13, T2 is an IGZO transistor, so it is able to reduce the leakage current, thereby to maintain the potential at the first node N1. In addition, five groups of Gate On Array (GOA) modules need to be used for driving, and the first light-emission control signal, the second light-emission control signal, the first scanning signal, the second scanning signal and the third scanning signal are provided by these five groups of GOA modules. The first resetting control signal and the first scanning signal are provided by a same GOA circuitry.

As shown in FIG. 14, during the operation of the pixel circuit in FIG. 13, the display cycle includes a first resetting phase S1, a compensation phase S2, a data writing phase S3, a second resetting phase S4 and a light-emitting phase S5 arranged one after another.

Within the first resetting phase S1, EM1 provides a high voltage signal, EM2 provides a high voltage signal, R1 provides a low voltage signal, G2 provides a high voltage signal, G1 provides a high voltage signal, R2 provides a high voltage signal, and G3 provides a low voltage signal, so as to turn on T5, T2 and T7. I1 provides the first initial voltage Vinit1, so the potential at the first node N1 is Vinit1. VR1 provides the first reference voltage Vref1, so the potential at the second node N2 is Vref1.

Within the compensation phase S2, EM1 provides a low voltage signal, EM2 provides a high voltage signal, R1 provides a high voltage signal, G2 provides a high voltage signal, G1 provides a high voltage signal, R2 provides a high voltage signal, and G3 provides a high voltage signal, so as to turn on T3, T2 and T7. At the beginning of the compensation phase S2, DTFT is turned on. The power source voltage from VDD charges C1 through T3, DTFT and T2 until the potential at the first node N1 is Vdd+Vth, and then DTFT is turned off, where Vdd is a voltage value of the power source voltage, and Vth is the threshold voltage of the DTFT.

Within the data writing phase S3, EM2 provides a high voltage signal, R1 provides a high voltage signal, G2 provides a low voltage signal, EM1 provides a high voltage signal, G1 provides a low voltage signal, R2 provides a high voltage signal, and G3 provides a high voltage signal, so as to turn on T1. DT provides the data voltage Vdata to the second node N2. At this time, the potential at the second node N2 is Vdata, and the potential at the first node N1 is Vdd+Vth+Vdata−Vref1.

Within the second resetting phase S4, EM2 provides a high voltage signal, R1 provides a high voltage signal, G2 provides a low voltage signal, EM1 provides a high voltage signal, G1 provides a high voltage signal, R2 provides a low voltage signal, and G3 provides a high voltage signal, so as to turn on T6 and T8. I2 provides the second initial voltage Vinit2 to the anode of O1, so as to control O1 not to emit light, and clear the charges in the anode of O1. VR2 provides the second reference voltage Vref2 to the source electrode of DTFT, so as to enable DTFT to be in a biased on-state, thereby to improve the hysteresis of DTFT.

Within the light-emitting phase S5, EM1 and EM2 provide a low voltage signal, R1, G3, G1 and R2 provide a high voltage signal, and G2 provides a low voltage signal, so as to turn on T3 and T4. At this time, DTFT drives O1 to emit light. $Io1=0.5\ K(Vgs-Vth)^2=0.5\ K\times(Vdd+Vth+Vdata-Vref1-Vdd-Vth)^2=0.5\ K\times(Vdata-Vref1)^2$, where K is a current coefficient of DTFT, Vgs is a gate-to-source voltage of DTFT, Vth is the threshold voltage of the DTFT, and Io1 is a light-emitting current of O1. Based on the above-mentioned formula, Io1 is independent of Vth and Vdd.

Figure 15:
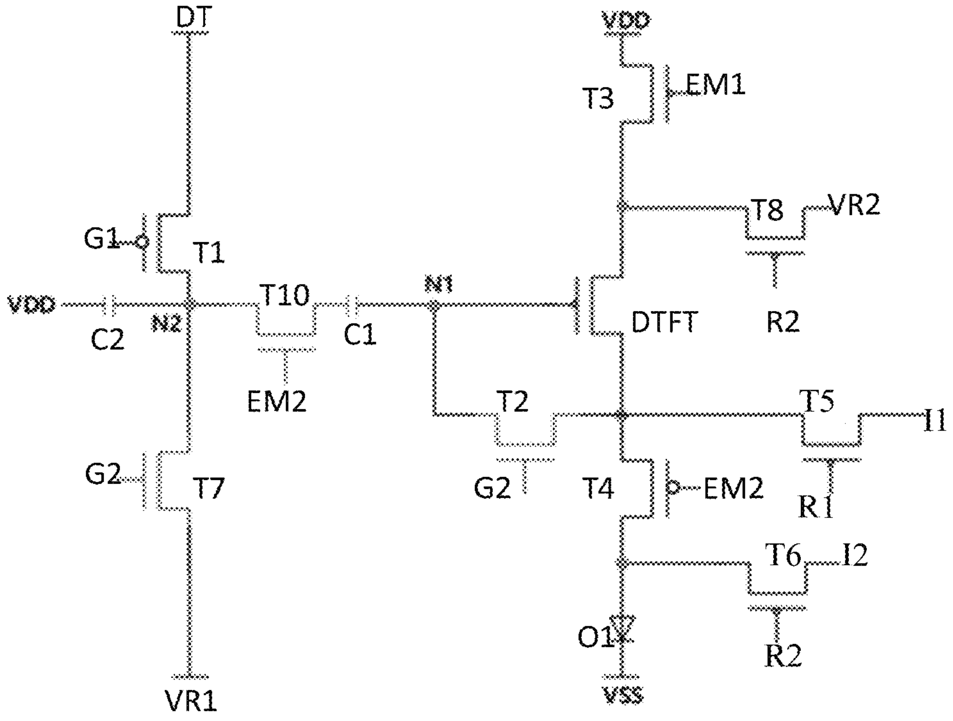
FIG. 15 is still yet another circuit diagram of the pixel circuit according to one embodiment of the present disclosure.

As shown in FIG. 15, on the basis of the pixel circuit in FIG. 6, the first energy storage circuitry includes a first capacitor C1, the second energy storage circuitry includes a second capacitor C2, the data writing circuitry includes a first transistor T1, the compensation control circuitry includes a second transistor T2, and the driving circuitry includes a driving transistor DTFT. The first light-emission control circuitry includes a third transistor T3, and the second light-emission control circuitry includes a fourth transistor T4. The first initialization circuitry includes a fifth transistor T5, and the second initialization circuitry includes a sixth transistor T6. The first resetting circuitry includes a seventh transistor T7, and the second resetting circuitry includes an eighth transistor T8. The light-emitting element is an organic light-emitting diode O1, and the first control circuit includes a tenth transistor T10. A gate electrode of the first transistor T1 is electrically coupled to the first scanning end G1, a source electrode of the first transistor T1 is electrically coupled to the data line DT, and a drain electrode of the first transistor T1 is electrically coupled to the second node N2. A gate electrode of the second transistor T2 is electrically coupled to the second scanning end G2, a source electrode of the second transistor T2 is electrically coupled to the first node N1, and a drain electrode of the second transistor T2 is electrically coupled to the drain electrode of the driving transistor DTFT. A first end of the first capacitor C1 is electrically coupled to the first node N1, and the second node N2 is electrically coupled to a second end of the first capacitor C1 through the tenth transistor T10. A first end of the second capacitor C2 is electrically coupled to the second node N2, and a second end of the second capacitor C2 is electrically coupled to the power source voltage end VDD. A gate electrode of the driving transistor DTFT is electrically coupled to the first node N1, a source electrode of the driving transistor DTFT is electrically coupled to the power source voltage end VDD, and a drain electrode of the driving transistor DTFT is electrically coupled to the anode of the organic light-emitting diode O1. A gate electrode of the third transistor T3 is electrically coupled to the first light-emission control end EM1, a source electrode of the third transistor T3 is electrically coupled to the power source voltage end VDD, and a drain electrode of the third transistor T3 is electrically coupled to the source electrode of the driving transistor DTFT. A gate electrode of the fourth transistor T4 is electrically coupled to the second light-emission control end EM2, a source electrode of the fourth transistor T4 is electrically coupled to the drain electrode of the driving transistor DTFT, and a drain electrode of the fourth transistor T4 is electrically coupled to the anode of the organic light-emitting diode O1. A gate electrode of the fifth transistor T5 is electrically coupled to the first resetting control end R1, a source electrode of the fifth transistor T5 is electrically coupled to the first initial voltage end I1, and a drain electrode of the fifth transistor T5 is electrically coupled to the drain electrode of the driving transistor DTFT. A gate electrode of the sixth transistor T6 is electrically coupled to the second resetting control end R2, a source electrode of the sixth transistor T6 is electrically coupled to the second initial voltage end I2, and a drain electrode of the sixth transistor T6 is electrically coupled to the anode of the organic light-emitting diode O1. A gate electrode of the seventh transistor T7 is electrically coupled to the second scanning end G2, a source electrode of the seventh transistor T7 is electrically coupled to the first reference voltage end VR1, and a drain electrode of the seventh transistor T7 is electrically coupled to the second node N2. A gate electrode of the eighth transistor T8 is electrically coupled to the second resetting control end R2, a source electrode of the eighth transistor T8 is electrically coupled to the second reference voltage end VR2, and a drain electrode of the eighth transistor T8 is electrically coupled to the source electrode of the driving transistor DTFT. A gate electrode of the tenth transistor T10 is electrically coupled to the second light-emission control end EM2, a source electrode of the tenth transistor T10 is electrically coupled to the second node N2, and a drain electrode of the tenth transistor T10 is electrically coupled to the second end of the first capacitor C1.

In FIG. 15, T2, T10 and T7 are n-type, oxide transistors, e.g., IGZO transistors, T1, T3, T4, T5, T6, T8 and DTFT are p-type transistors, e.g., LTPS transistors.

In FIG. 15, T2, T10 and T7 are IGZO transistors. The IGZO transistor has a small leakage current, so it is able to ensure the stability of the potential at the first node N1 even in the case of low-frequency display, thereby to achieve the normal driving.

Figure 16:
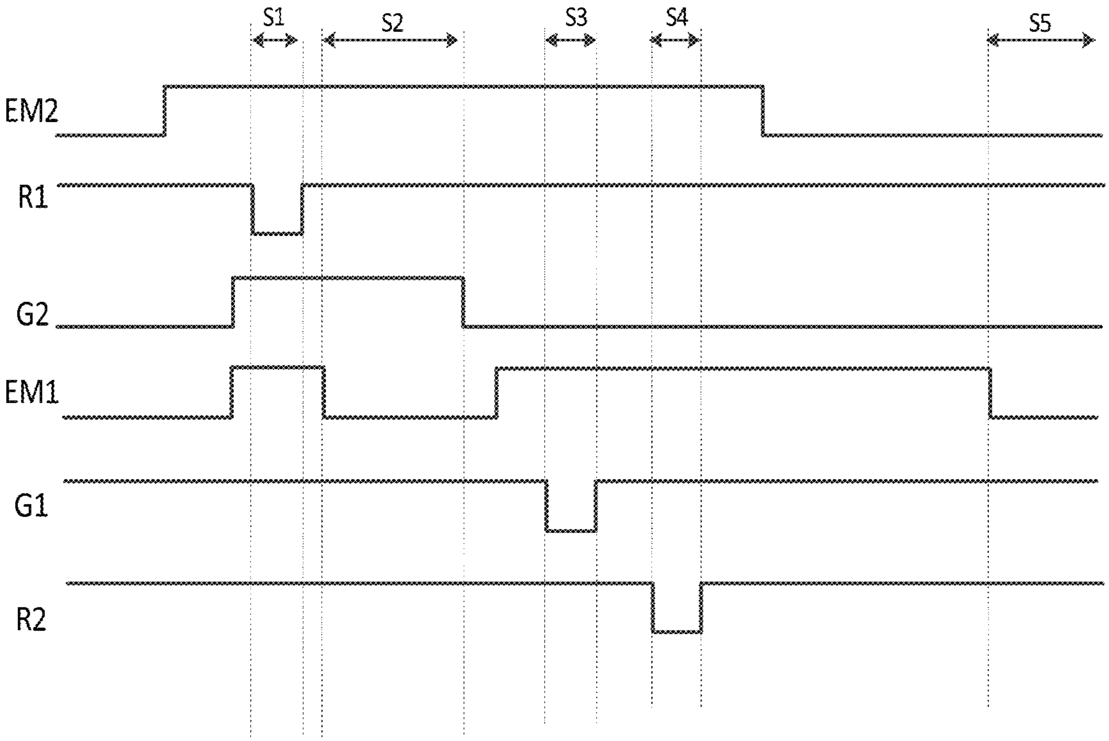
FIG. 16 is a sequence diagram of the pixel circuit in FIG. 15.

In FIG. 15, T10 and T7 are electrically coupled to the second node N2, and T10 and T7 are IGZO transistors, so it is able to maintain the potential at the second node N2 in the case of low-frequency display, thereby to prevent the potential at the first node N1 from being adversely affected by the potential at the second node N2 through the first capacitor C1, and ensure the stability of the potential at the first node N1 in the case of low-frequency display. FIG. 16 is a sequence diagram of the pixel circuit in FIG. 15.

In FIG. 15, T2 and T10 are IGZO transistors, and the IGZO transistor has a small leakage current, so it is able to maintain the potential at the first node N1 in the case of low-frequency display, thereby to achieve the normal driving at a low frequency.

As shown in FIG. 16, during the operation of the pixel circuit in FIG. 15, the display cycle includes a first resetting phase S1, a compensation phase S2, a data writing phase S3, a second resetting phase S4 and a light-emitting phase S5 which are arranged one after another.

Within the first resetting phase S1, EM1 provides a high voltage signal, EM2 provides a high voltage signal, R1 provides a low voltage signal, G2 provides a low voltage signal, G1 provides a high voltage signal, and R2 provides a high voltage signal, so as to turn on T5, T2 and T7 as well as T10. I1 provides the first initial voltage Vinit1, so the potential at the first node N1 is Vinit1. VR1 provides the first reference voltage Vref1, so the potential at the second node N2 is Vref1.

Within the compensation phase S2, EM1 provides a low voltage signal, EM2 provides a high voltage signal, R1 provides a high voltage signal, G2 provides a low voltage signal, G1 provides a high voltage signal, and R2 provides a high voltage signal, so as to turn on T3, T2, T7 and T10. At the beginning of the compensation phase S2, DTFT is turned on, and the power source voltage from VDD charges C1 through T3, DTFT and T2 until the potential at the first node N1 is Vdd+Vth, and then the DTFT is turned off, where Vdd is a voltage value of the power source voltage, and Vth is the threshold voltage of the DTFT.

Within the data writing phase S3, EM2 provides a high voltage signal, R1 provides a high voltage signal, G2 provides a high voltage signal, EM1 provides a high voltage signal, G1 provides a low voltage signal, and R2 provides a high voltage signal, so as to turn on T1 and T10. DT provides the data voltage Vdata to the second node N2. At this time, the potential at the second node N2 is Vdata, and the potential at the first node N1 is Vdd+Vth+Vdata−Vref1.

Within the second resetting phase S4, EM2 provides a high voltage signal, R1 provides a high voltage signal, G2 provides a high voltage signal, EM1 provides a high voltage signal, G1 provides a high voltage signal, and R2 provides a low voltage signal, so as to turn on T6, T8 and T10. I2 provides the second initial voltage Vinit2 to the anode of O1, so as to control O1 not to emit light, and clear the charges in the anode of O1. VR2 provides the second reference voltage Vref2 to the source electrode of DTFT, so as to enable DTFT to be in a biased on-state, thereby to improve the hysteresis of DTFT.

Within the light-emitting phase S5, EM1 and EM2 provide a low voltage signal, and R1, G2, G1 and R2 provide a high voltage signal, so as to turn off T10 and turn on T3 and T4. At this time, DTFT drives O1 to emit light. Io1=0.5 $K(Vgs-Vth)^2$=0.5 K×$(Vdd+Vth+Vdata-Vref1-Vdd-Vth)^2$=0.5 K×$(Vdata-Vref1)^2$, where K is a current coefficient of DTFT, Vgs is a gate-to-source voltage of DTFT, Vth is the threshold voltage of DTFT, and Io1 is a light-emitting current of O1. Based on the above-mentioned formula, Io1 is independent of Vth and Vdd.

Figure 17:
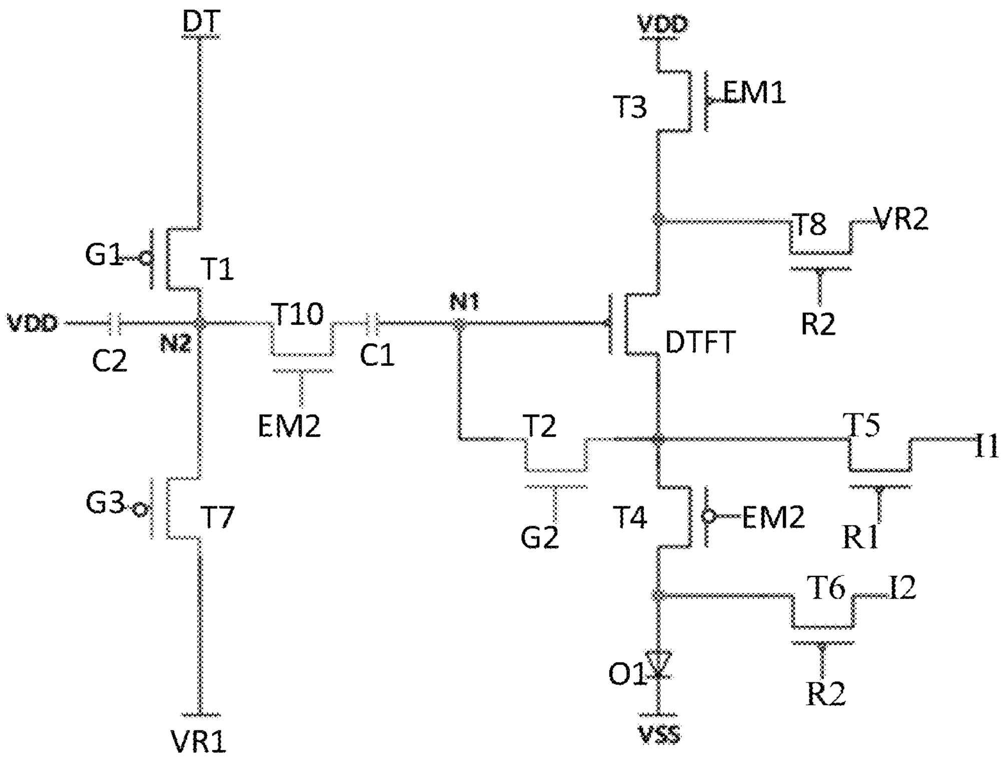
FIG. 17 is still yet another circuit diagram of the pixel circuit according to one embodiment of the present disclosure.

The pixel circuit in FIG. 17 differs from the pixel circuit in FIG. 15 in that T7 is a p-type, LTPS transistor, and the gate electrode of T7 is electrically coupled to the third scanning end G3.

In FIG. 17, T10 is an IGZO transistor, so T7 and T1 are LTPS transistors, so as to reduce a space occupied by the pixel circuit.

Figure 18:
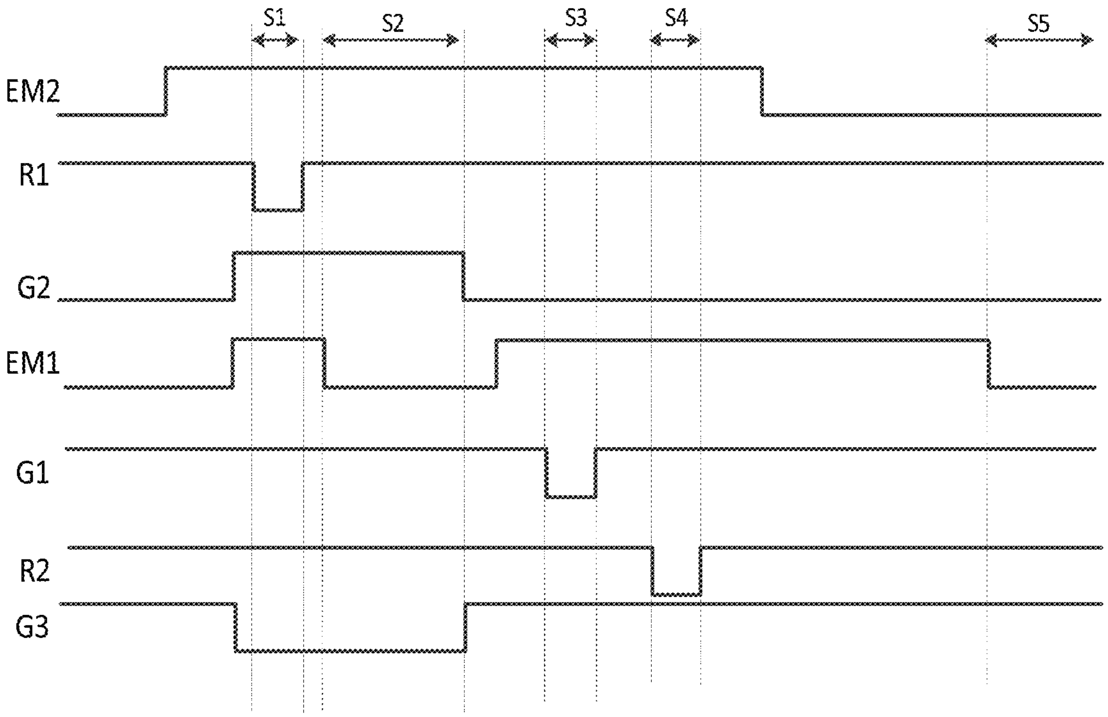
FIG. 18 is a sequence diagram of the pixel circuit in FIG. 17.

FIG. 18 is a sequence diagram of the pixel circuit in FIG. 17.

In FIG. 18, the second scanning signal from G2 has a phase reverse to the third scanning signal from G3.

Figure 19:
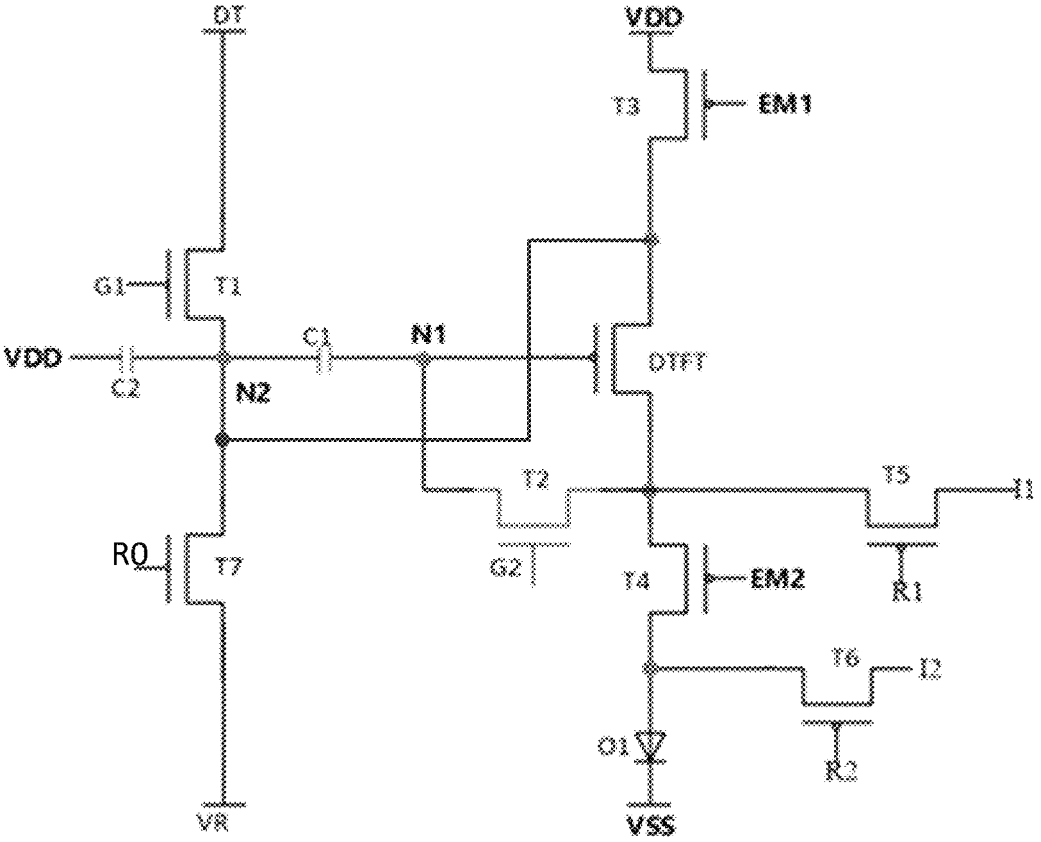
FIG. 19 is still yet another circuit diagram of the pixel circuit according to one embodiment of the present disclosure.

As shown in FIG. 19, on the basis of the pixel circuit in FIG. 5, the first energy storage circuitry includes a first capacitor C1, the second energy storage circuitry includes a second capacitor C2, the data writing circuitry includes a first transistor T1, the compensation control circuitry includes a second transistor T2, and the driving circuitry includes a driving transistor DTFT. The first light-emission control circuitry includes a third transistor T3, and the second light-emission control circuitry includes a fourth transistor T4. The first initialization circuitry includes a fifth transistor T5, and the second initialization circuitry includes a sixth transistor T6. The resetting circuitry includes a seventh transistor T7, and the light-emitting element is an organic light-emitting diode O1. A gate electrode of the first transistor T1 is electrically coupled to the first scanning end G1, a source electrode of the first transistor T1 is electrically coupled to the data line DT, and a drain electrode of the first transistor T1 is electrically coupled to the second node N2. A gate electrode of the second transistor T2 is electrically coupled to the second scanning end G2, a source electrode of the second transistor T2 is electrically coupled to the first node N1, and a drain electrode of the second transistor T2 is electrically coupled to the drain electrode of the driving transistor DTFT. A first end of the first capacitor C1 is electrically coupled to the first node N1, and a second end of the first capacitor C1 is electrically coupled to the second node N2. A first end of the second capacitor C2 is electrically coupled to the second node N2, and a second end of the second capacitor C2 is electrically coupled to the power source voltage end VDD. A gate electrode of the driving transistor DTFT is electrically coupled to the first node N1. A gate electrode of the third transistor T3 is electrically coupled to the first light-emission control end EM1, a source electrode of the third transistor T3 is electrically coupled to the power source voltage end VDD, and a drain electrode of the third transistor T3 is electrically coupled to the source electrode of the driving transistor DTFT. A gate electrode of the fourth transistor T4 is electrically coupled to the second light-emission control end EM2, a source electrode of the fourth transistor T4 is electrically coupled to the drain electrode of the driving transistor DTFT, and a drain electrode of the fourth transistor T4 is electrically coupled to the anode of the organic light-emitting diode O1. A gate electrode of the fifth transistor T5 is electrically coupled to the first resetting control end R1, a source electrode of the fifth transistor T5 is electrically coupled to the first initial voltage end I1, and a drain electrode of the fifth transistor T5 is electrically coupled to the drain electrode of the driving transistor DTFT. A gate electrode of the sixth transistor T6 is electrically coupled to the second resetting control end R2, a source electrode of the sixth transistor T6 is electrically coupled to the second initial voltage end I2, and a drain electrode of the sixth transistor T6 is electrically coupled to the anode of the organic light-emitting diode O1. A cathode of the organic light-emitting diode O1 is electrically coupled to the low voltage end VSS. A gate electrode of the seventh transistor T7 is electrically coupled to the resetting control end R0, a source electrode of the seventh transistor T7 is electrically coupled to the reference voltage end VR, and a drain electrode of the seventh transistor T7 is electrically coupled to the second node N2 and the drain electrode of the driving transistor DTFT.

In FIG. 19, T2, T7, and T1 are n-type, oxide transistors, e.g., IGZO transistors.

Figure 20:
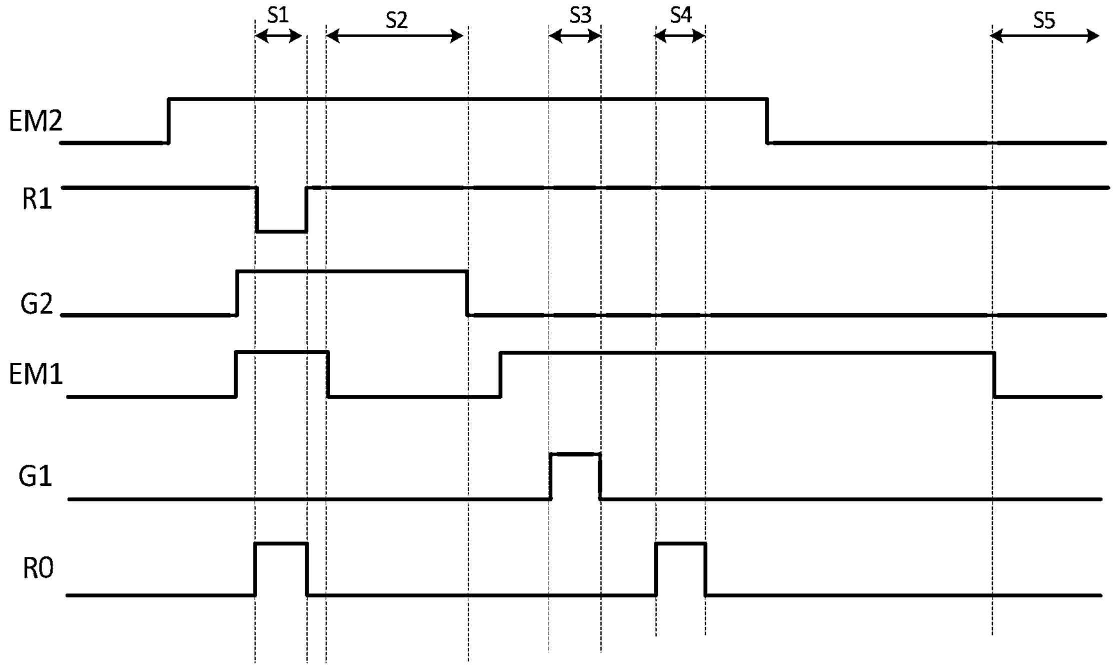
FIG. 20 is a sequence diagram of the pixel circuit in FIG. 19.

As shown in FIG. 20, during the operation of the pixel circuit in FIG. 19, the display cycle includes a first resetting phase S1, a compensation phase S2, a data writing phase S3, a second resetting phase S4 and a light-emitting phase S5 arranged one after another.

Within the first resetting phase S1, EM1 provides a high voltage signal, EM2 provides a high voltage signal, R1 provides a low voltage signal, G2 provides a high voltage signal, G1 provides a low voltage signal, and R0 provides a high voltage signal, so as to turn on T5, T2 and T7. I1 provides the first initial voltage Vinit1, so the potential at the first node N1 is Vinit1. VR provides the first reference voltage Vref1, so the potential at the second node N2 is Vref1.

Within the compensation phase S2, EM1 provides a low voltage signal, EM2 provides a high voltage signal, R1 provides a high voltage signal, G2 provides a high voltage signal, G1 provides a low voltage signal, R2 provides a high voltage signal, and R0 provides a low voltage signal, so as to turn on T3 and T2. At the beginning of the compensation phase S2, DTFT is turned on, and the power source voltage from VDD charges C1 through T3, DTFT and T2 until the potential at the first node N1 is Vdd+Vth, and then DFTF is turned off, where Vdd is a voltage value of the power source voltage, and Vth is the threshold voltage of DTFT.

Within the data writing phase S3, EM2 provides a high voltage signal, R1 provides a high voltage signal, G2 provides a low voltage signal, EM1 provides a high voltage signal, G1 provides a low voltage signal, and R0 provides a low voltage signal, so as to turn on T1. At this time, DT provides the data voltage Vdata to the second node N2.

Within the second resetting phase S4, EM2 provides a high voltage signal, R1 provides a high voltage signal, G2 provides a low voltage signal, EM1 provides a high voltage signal, G1 provides a high voltage signal, and R0 provides a high voltage signal, so as to turn on T6 and T7. I2 provides the second initial voltage Vinit2 to the anode of O1, so as to control O1 not to emit light, and clear the charges in the anode of O1. VR provides the second reference voltage Vref2 to the source electrode of DTFT, so as to enable DTFT to be in a biased on-state, thereby to improve the hysteresis of DTFT.

Within the light-emitting phase S5, EM1 and EM2 provide a low voltage signal, G2 provides a low voltage signal, R1 provides a high voltage signal, G1 provides a low voltage signal, and R0 provides a low voltage signal, so as to turn on T3 and T4. At this time, DTFT drives O1 to emit light.

The present disclosure further provides in some embodiments a pixel driving method for the above-mentioned pixel circuit. The display cycle includes a compensation phase and a data writing phase independent of each other. The pixel driving method includes: within the compensation phase, controlling, by the compensation control circuitry, the first node to be electrically coupled to the second end of the driving circuitry under the control of the second scanning signal; and within the data writing phase, writing, by the data writing circuitry, the data voltage from the data line into the second node under the control of the first scanning signal.

In at least one embodiment of the present disclosure, the display cycle is a refresh frame.

According to the pixel driving method in the embodiments of the present disclosure, the compensation phase is separated from the data writing phase, so as to improve the threshold voltage compensation capability in the case of high-frequency display. As a result, event when a 1 H (a scanning time for one row) is very small, it is still able for the pixel circuit to compensate for the threshold voltage of the driving transistor in a better manner in the case of high-frequency display.

In at least one embodiment of the present disclosure, the pixel circuit further includes the first initialization circuitry, the second initialization circuitry, the first resetting circuitry, and the second resetting circuitry. The display cycle further includes a first resetting phase arranged before the compensation phase and a second resetting phase arranged after the data writing phase. The pixel driving method further includes: within the first resetting phase, controlling, by the compensation control circuitry, the first node to be electrically coupled to the second end of the driving circuitry under the control of the second scanning signal, writing, by the first initialization circuitry, the first initial voltage into the second end of the driving circuitry under the control of the first resetting control signal, and writing, by the first resetting circuitry, the first reference voltage into the second node under the control of the third scanning signal; and within the second resetting phase, writing, by the second initialization circuitry, the second initial voltage into the first electrode of the light-emitting element under the control of the second resetting control signal, and writing, by the second resetting circuitry, the second reference voltage into the first end of the driving circuitry under the control of the third resetting control signal.

In at least one embodiment of the present disclosure, the pixel circuit further includes the first initialization circuitry, the second initialization circuitry and the resetting circuitry. The display cycle further includes a first resetting phase arranged before the compensation phase and a second resetting phase arranged after the data writing phase. The pixel driving method further includes: within the first resetting phase, controlling, by the compensation control circuitry, the first node to be electrically coupled to the second end of the driving circuitry under the control of the second scanning signal, writing, by the first initialization circuitry, the first initial voltage into the second end of the driving circuitry under the control of the first resetting control signal, and writing, by the resetting circuitry, the first reference voltage from the reference voltage end into the second node under the control of the resetting control signal; and within the second resetting phase, writing, by the second initialization circuitry, the second initial voltage into the first electrode of the light-emitting element under the control of the second resetting control signal, and writing, by the resetting circuitry, the second reference voltage from the reference voltage end into the first end of the driving circuitry under the control of the resetting control signal.

In at least one embodiment of the present disclosure, the display cycle further includes a light-emitting phase arranged after the second resetting phase, and the pixel circuit further includes the first light-emission control circuitry and the second light-emission control circuitry. The pixel driving method further includes: within the light-emitting phase, controlling, by the first light-emission control circuitry, the power source voltage end to be electrically coupled to the first end of the driving circuitry under the control of the first light-emission control signal, controlling, by the second light-emission control circuitry, the second end of the driving circuitry to be electrically coupled to the first electrode of the light-emitting element under the control of the second light-emission control signal, and driving, by the driving circuitry, the light-emitting element.

In at least one embodiment of the present disclosure, when the pixel circuit is used for low-frequency display, a maintenance frame includes an initialization phase and a light-emission maintenance phase arranged one after another, and the pixel circuit further includes the second initialization circuitry, the first light-emission control circuitry and the second light-emission control circuitry. The pixel driving method further includes: within the initialization phase, writing, by the second initialization circuitry, the second initial voltage into the first electrode of the light-emitting element under the control of the second resetting control signal; and within the light-emission maintenance phase, controlling, by the first light-emission control circuitry, the power source voltage end to be electrically coupled to the first end of the driving circuitry under the control of the first light-emission control signal, controlling, by the second light-emission control circuitry, the second end of the driving circuitry to be electrically coupled to the first electrode of the light-emitting element under the control of the second light-emission control signal, and driving, by the driving circuitry, the light-emitting element.

The present disclosure further provides in some embodiments a display device including the above-mentioned pixel circuit.

The above embodiments are for illustrative purposes only, but the present disclosure is not limited thereto.

Obviously, a person skilled in the art may make further modifications and improvements without departing from the spirit of the present disclosure, and these modifications and improvements shall also fall within the scope of the present disclosure.

What is claimed is:

1. A pixel circuit, comprising a light-emitting element, a driving circuitry, a first energy storage circuitry, a second energy storage circuitry, a data writing circuitry and a compensation control circuitry, wherein a first end of the first energy storage circuitry is electrically coupled to a first node, a second end of the first energy storage circuitry is electrically coupled to a second node, and the first energy storage circuitry is configured to store electric energy;

a first end of the second energy storage circuitry is electrically coupled to the second node, a second end of the second energy storage circuitry is electrically coupled to a first voltage end, and the second energy storage circuitry is configured to store electric energy;

the data writing circuitry is electrically coupled to a first scanning end, a data line and the second node, and configured to write a data voltage from the data line into the second node under the control of a first scanning signal from the first scanning end;

the compensation control circuitry is electrically coupled to a second scanning end, the first node and a second end of the driving circuitry, and configured to control the first node to be electrically coupled to the second end of the driving circuitry under the control of a second scanning signal from the second scanning end;

a control end of the driving circuitry is electrically coupled to the first node, a first end of the driving circuitry is electrically coupled to a power source voltage end, the second end of the driving circuitry is electrically coupled to the light-emitting element, and the driving circuitry is configured to drive the light-emitting element under the control of a potential at the first node; and an effective enabling time period of the second scanning end does not overlap with an effective enabling time period of the first scanning end, and a length of the effective enabling time period of the second scanning end is greater than a length of the effective enabling time period of the first scanning end;

wherein the pixel circuit further comprises a first light-emission control circuitry and a second light-emission control circuitry, wherein the first end of the driving circuitry is electrically coupled to the power source voltage end via the first light-emission control circuitry, the second end of the driving circuitry is electrically coupled to a first electrode of the light-emitting element via the second light-emission control circuitry, and a second electrode of the light-emitting element is electrically coupled to a second voltage end;

the first light-emission control circuitry is electrically coupled to a first light-emission control end, the power source voltage end and the first end of the driving circuitry, and configured to control the power source voltage end to be electrically coupled to the first end of the driving circuitry under the control of a first light-emission control signal from the first light-emission control end;

the second light-emission control circuitry is electrically coupled to a second light-emission control end, the second end of the driving circuitry and the first electrode of the light-emitting element, and configured to control the second end of the driving circuitry to be electrically coupled to the first electrode of the light-emitting element under the control of a second light-emission control signal from the second light-emission control end;

wherein the pixel circuit further comprises a first initialization circuitry and a second initialization circuitry, wherein the first initialization circuitry is electrically coupled to a first resetting control end, a first initial voltage end and the second end of the driving circuitry, and configured to write a first initial voltage from the first initial voltage end into the second end of the driving circuitry under the control of a first resetting control signal from the first resetting control end;

the second initialization circuitry is electrically coupled to a second resetting control end, a second initial voltage end and the first electrode of the light-emitting element, and configured to write a second initial voltage from the second initial voltage end into the first electrode of the light-emitting element under the control of a second resetting control signal from the second resetting control end; and a length of an effective enabling time period of the first resetting control end is less than a length of the effective enabling time period of the second scanning end, and the effective enabling time period of the first resetting control end overlaps within the effective enabling time period of the second scanning end.

2. The pixel circuit according to claim 1, wherein the effective enabling time period of the first resetting control end does not overlap with an effective enabling time period of the first light-emission control end.

3. The pixel circuit according to claim 1, wherein the first initialization circuitry comprises a fifth transistor, and the second initialization circuitry comprises a sixth transistor;

a gate electrode of the fifth transistor is electrically coupled to the first resetting control end, a first electrode of the fifth transistor is electrically coupled to the first initial voltage end, and a second electrode of the fifth transistor is electrically coupled to the second end of the driving circuitry; and a gate electrode of the sixth transistor is electrically coupled to the second resetting control end, a first electrode of the sixth transistor is electrically coupled to the second initial voltage end, and a second electrode of the sixth transistor is electrically coupled to the first electrode of the light-emitting element.

4. The pixel circuit according to claim 1, further comprising a first resetting circuitry and a second resetting circuitry, wherein the first resetting circuitry is electrically coupled to a third scanning end, a first reference voltage end and the second node, and configured to write a first reference voltage from the first reference voltage end into the second node under the control of a third scanning signal from the third scanning end; and the second resetting circuitry is electrically coupled to a third resetting control end, a second reference voltage end and the first end of the driving circuitry, and configured to write a second reference voltage from the second reference voltage end into the first end of the driving circuitry under the control of a third resetting control signal from the third resetting control end.

5. The pixel circuit according to claim 4, wherein the first resetting circuitry comprises a seventh transistor, and the second resetting circuitry comprises an eighth transistor;

a gate electrode of the seventh transistor is electrically coupled to the third scanning end, a first electrode of the seventh transistor is electrically coupled to the first reference voltage end, and a second electrode of the seventh transistor is electrically coupled to the second node;

a gate electrode of the eighth transistor is electrically coupled to the third resetting control end, a first electrode of the eighth transistor is electrically coupled to the second reference voltage end, and a second electrode of the eighth transistor is electrically coupled to the first end of the driving circuitry; and the seventh transistor is an oxide transistor or a low-temperature polysilicon transistor.

6. The pixel circuit according to claim 1, further comprising a resetting circuitry electrically coupled to a resetting control end, a reference voltage end, the second node and the first end of the driving circuitry, and configured to write a reference voltage from the reference voltage end into the second node and/or the first end of the driving circuitry under the control of a resetting control signal from the resetting control end.

7. The pixel circuit according to claim 6, wherein the resetting circuitry comprises a ninth transistor, a gate electrode of the ninth transistor is electrically coupled to the resetting control end, a first electrode of the ninth transistor is electrically coupled to the reference voltage end, and a second electrode of the ninth transistor is electrically coupled to the second node and the first end of the driving circuitry.

8. The pixel circuit according to claim 1, further comprising a first control circuit electrically coupled to a first control end, the second node and the second end of the first energy storage circuitry, and configured to control the second node to be electrically coupled to the second end of the first energy storage circuitry under the control of a first control signal from the first control end.

9. The pixel circuit according to claim 8, wherein the first control circuit comprises a tenth transistor, the second node is electrically coupled to the second end of the first energy storage circuitry through the tenth transistor, a gate electrode of the tenth transistor is electrically coupled to the first control end, a first electrode of the tenth transistor is electrically coupled to the second node, and a second electrode of the tenth transistor is electrically coupled to the second end of the first energy storage circuitry.

10. The pixel circuit according to claim 9, wherein the tenth transistor is an oxide transistor.

11. The pixel circuit according to claim 1, wherein the first light-emission control circuitry comprises a third transistor, and the second light-emission control circuitry comprises a fourth transistor;

a gate electrode of the third transistor is electrically coupled to the first light-emission control end, a first electrode of the third transistor is electrically coupled to the power source voltage end, and a second electrode of the third transistor is electrically coupled to the first end of the driving circuitry; and a gate electrode of the fourth transistor is electrically coupled to the second light-emission control end, a first electrode of the fourth transistor is electrically coupled to the second end of the driving circuitry, and a second electrode of the fourth transistor is electrically coupled to the first electrode of the light-emitting element.

12. The pixel circuit according to claim 1, wherein the first energy storage circuitry comprises a first capacitor, the second energy storage circuitry comprises a second capacitor, the data writing circuitry comprises a first transistor, the compensation control circuitry comprises a second transistor, and the driving circuitry comprises a driving transistor;

a gate electrode of the first transistor is electrically coupled to the first scanning end, a first electrode of the first transistor is electrically coupled to the data line, and a second electrode of the first transistor is electrically coupled to the second node;

a gate electrode of the second transistor is electrically coupled to the second scanning end, a first electrode of the second transistor is electrically coupled to the first node, and a second electrode of the second transistor is electrically coupled to the second end of the driving circuitry;

a first end of the first capacitor is electrically coupled to the first node, and a second end of the first capacitor is electrically coupled to the second node;

a first end of the second capacitor is electrically coupled to the second node, and a second end of the second capacitor is electrically coupled to the first voltage end; and a gate electrode of the driving transistor is electrically coupled to the first node, a first electrode of the driving transistor is electrically coupled to the power source voltage end, and a second electrode of the driving transistor is electrically coupled to the light-emitting element.

13. The pixel circuit according to claim 12, wherein the second transistor is an oxide transistor, and the first transistor is a low-temperature polysilicon transistor, or the first transistor and the second transistor are both oxide transistors.

14. A pixel driving method for the pixel circuit according to claim 1, a display cycle comprising a compensation phase and a data writing phase independent of each other, the pixel driving method comprising:

within the compensation phase, controlling, by the compensation control circuitry, the first node to be electrically coupled to the second end of the driving circuitry under the control of the second scanning signal; and within the data writing phase, writing, by the data writing circuitry, the data voltage from the data line into the second node under the control of the first scanning signal.

15. The pixel driving method according to claim 14, wherein the pixel circuit further comprises the first initialization circuitry, the second initialization circuitry, the first resetting circuitry, the second resetting circuitry, the first light-emission control circuitry and the second light-emission control circuitry, the display cycle further comprises a first resetting phase arranged before the compensation phase, and a second resetting phase and a light-emitting phase arranged after the data writing phase, and the light-emitting phase is arranged after the second resetting phase, wherein the pixel driving method further comprises:

within the first resetting phase, controlling, by the compensation control circuitry, the first node to be electrically coupled to the second end of the driving circuitry under the control of the second scanning signal, writing, by the first initialization circuitry, the first initial voltage into a second end of the driving circuitry under the control of the first resetting control signal, and writing, by the first resetting circuitry, a first reference voltage into the second node under the control of the third scanning signal;

within the second resetting phase, writing, by the second initialization circuitry, the second initial voltage into the first electrode of the light-emitting element under the control of the second resetting control signal, and writing, by the second resetting circuitry, the second reference voltage into the first end of the driving circuitry under the control of the third resetting control signal; and within the light-emitting phase, controlling, by the first light-emission control circuitry, the power source voltage end to be electrically coupled to the first end of the driving circuitry under the control of the first light-emission control signal, controlling, by the second light-emission control circuitry, the second end of the driving circuitry to be electrically coupled to the first electrode of the light-emitting element under the control of the second light-emission control signal, and driving, by the driving circuitry, the light-emitting element.

16. The pixel driving method according to claim 14, wherein the pixel circuit further comprises the first initialization circuitry, the second initialization circuitry, the resetting circuitry, the first light-emission control circuitry and the second light-emission control circuitry, the display cycle further comprises a first resetting phase arranged before the compensation phase, and a second resetting phase and a light-emitting phase arranged after the data writing phase, and the light-emitting phase is arranged after the second resetting phase, wherein the pixel driving method further comprises:

within the first resetting phase, controlling, by the compensation control circuitry, the first node to be electrically coupled to the second end of the driving circuitry under the control of the second scanning signal, writing, by the first initialization circuitry, the first initial voltage into the second end of the driving circuitry under the control of the first resetting control signal, and writing, by the resetting circuitry, the first reference voltage from the reference voltage end into the second node under the control of the resetting control signal;

within the second resetting phase, writing, by the second initialization circuitry, the second initial voltage into the first electrode of the light-emitting element under the control of the second resetting control signal, and writing, by the resetting circuitry, the second reference voltage from the reference voltage end into the first end of the driving circuitry under the control of the resetting control signal; and within the light-emitting phase, controlling, by the first light-emission control circuitry, the power source voltage end to be electrically coupled to the first end of the driving circuitry under the control of the first light-emission control signal, controlling, by the second light-emission control circuitry, the second end of the driving circuitry to be electrically coupled to the first electrode of the light-emitting element under the control of the second light-emission control signal, and driving, by the driving circuitry, the light-emitting element.

17. The pixel driving method according to claim 14, wherein a maintenance frame comprises an initialization phase and a light-emission maintenance phase arranged one after another, and the pixel circuit further comprises the second initialization circuitry, the first light-emission control circuitry and the second light-emission control circuitry, wherein the pixel driving method further comprises:

within the initialization phase, writing, by the second initialization circuitry, the second initial voltage into the first electrode of the light-emitting element under the control of the second resetting control signal; and within the light-emission maintenance phase, controlling, by the first light-emission control circuitry, the power source voltage end to be electrically coupled to the first end of the driving circuitry under the control of the first light-emission control signal, controlling, by the second light-emission control circuitry, the second end of the driving circuitry to be electrically coupled to the first electrode of the light-emitting element under the control of the second light-emission control signal, and driving, by the driving circuitry, the light-emitting element.

18. A display device, comprising the pixel circuit according to claim 1.

* * * * *